(12) United States Patent
Kono

(10) Patent No.: US 11,310,166 B2
(45) Date of Patent: Apr. 19, 2022

(54) ALLOCATION RESOURCE FOR CHAT BOT BASED ON CONVERSATIONS RELATED OR UNRELATED TO SERVICE MENU

(71) Applicant: Hitachi Systems, Ltd., Tokyo (JP)

(72) Inventor: Yasutaka Kono, Tokyo (JP)

(73) Assignee: HITACHI SYSTEMS, LTD., Tokyo (JP)

( * ) Notice: Subject to any disclaimer, the term of this patent is extended or adjusted under 35 U.S.C. 154(b) by 0 days.

(21) Appl. No.: 17/284,836

(22) PCT Filed: Mar. 1, 2019

(86) PCT No.: PCT/JP2019/008068
§ 371 (c)(1),
(2) Date: Apr. 13, 2021

(87) PCT Pub. No.: WO2020/090132
PCT Pub. Date: May 7, 2020

(65) Prior Publication Data
US 2021/0392086 A1     Dec. 16, 2021

(30) Foreign Application Priority Data
Oct. 30, 2018    (JP) .............................. JP2018-203603

(51) Int. Cl.
*H04L 47/762*     (2022.01)
*H04L 47/78*     (2022.01)
(Continued)

(52) U.S. Cl.
CPC ............ *H04L 47/762* (2013.01); *G06F 13/00* (2013.01); *H04L 47/781* (2013.01);
(Continued)

(58) Field of Classification Search
CPC .. G06F 13/00; G06F 16/3329; G06F 16/3331; G06F 16/3344; G06F 40/55;
(Continued)

(56) References Cited

U.S. PATENT DOCUMENTS 9,817,690 B2   11/2017   Feng
2003/0185232 A1*   10/2003   Moore ................... H04M 15/00
                                                        704/E15.045
(Continued)

FOREIGN PATENT DOCUMENTS

JP    2009-003533 A    1/2009
JP    2015-081971 A    4/2015
JP    2017-162059 A    9/2017

OTHER PUBLICATIONS

International Search Report and Written Opinion of International Searching Authority dated Mar. 26, 2019, issued in counterpart International Application No. PCT/JP2019/008068.
(Continued)

*Primary Examiner* — Le H Luu
(74) *Attorney, Agent, or Firm* — Renner, Otto, Boisselle & Sklar, LLP

(57) ABSTRACT

Techniques are provided that can perform appropriate resource allocation to systems such as chat bots and back-end-systems even when a user is engaged in conversations (such as text messages and speech messages) unrelated to service menus, without increasing the resources of the chat bots and back-end-systems. Means are provided for determining the allocation of chat bot and back-end-system resources based on the number of conversations associated with the service menu and the number of conversations unrelated to the service menu.

12 Claims, 19 Drawing Sheets

(51) Int. Cl.
   *H04L 47/80*  (2022.01)
   *H04L 47/70*  (2022.01)
   *H04L 47/83*  (2022.01)
   *G06F 13/00*  (2006.01)
(52) U.S. Cl.
   CPC .......... *H04L 47/808* (2013.01); *H04L 47/822* (2013.01); *H04L 47/823* (2013.01)
(58) Field of Classification Search
   CPC ... H04L 47/762; H04L 47/781; H04L 47/808; H04L 47/822; H04L 47/823; G06N 20/00; G06N 3/08; G06Q 30/01; G06Q 50/01; H04M 15/00; H04M 7/0012
   See application file for complete search history.

(56) References Cited

U.S. PATENT DOCUMENTS

| | | | |
|---|---|---|---|
| 2015/0350436 A1* | 12/2015 | Vymenets | H04M 7/0012 379/265.09 |
| 2016/0124919 A1* | 5/2016 | Chakra | G06F 16/3331 715/234 |
| 2016/0330131 A1 | 11/2016 | Avaya | |
| 2018/0075335 A1* | 3/2018 | Braz | G06F 16/3329 |
| 2018/0121766 A1* | 5/2018 | McCord | G06N 3/08 |
| 2018/0225365 A1* | 8/2018 | Altaf | G06F 16/3344 |
| 2018/0268344 A1* | 9/2018 | Bastide | G06Q 30/01 |
| 2018/0322462 A1* | 11/2018 | Jayaraman | G06N 20/00 |
| 2018/0329880 A1* | 11/2018 | Galitsky | G06F 40/55 |
| 2019/0034824 A1* | 1/2019 | Cagadas | G06N 20/00 |
| 2019/0122162 A1* | 4/2019 | Abhinav | G06Q 50/01 |
| 2019/0362817 A1* | 11/2019 | Kozloski | G06N 20/00 |

OTHER PUBLICATIONS

English Translation of International Search Report of International Searching Authority dated Mar. 26, 2019, issued in counterpart International Application No. PCT/JP2019/008068.

* cited by examiner

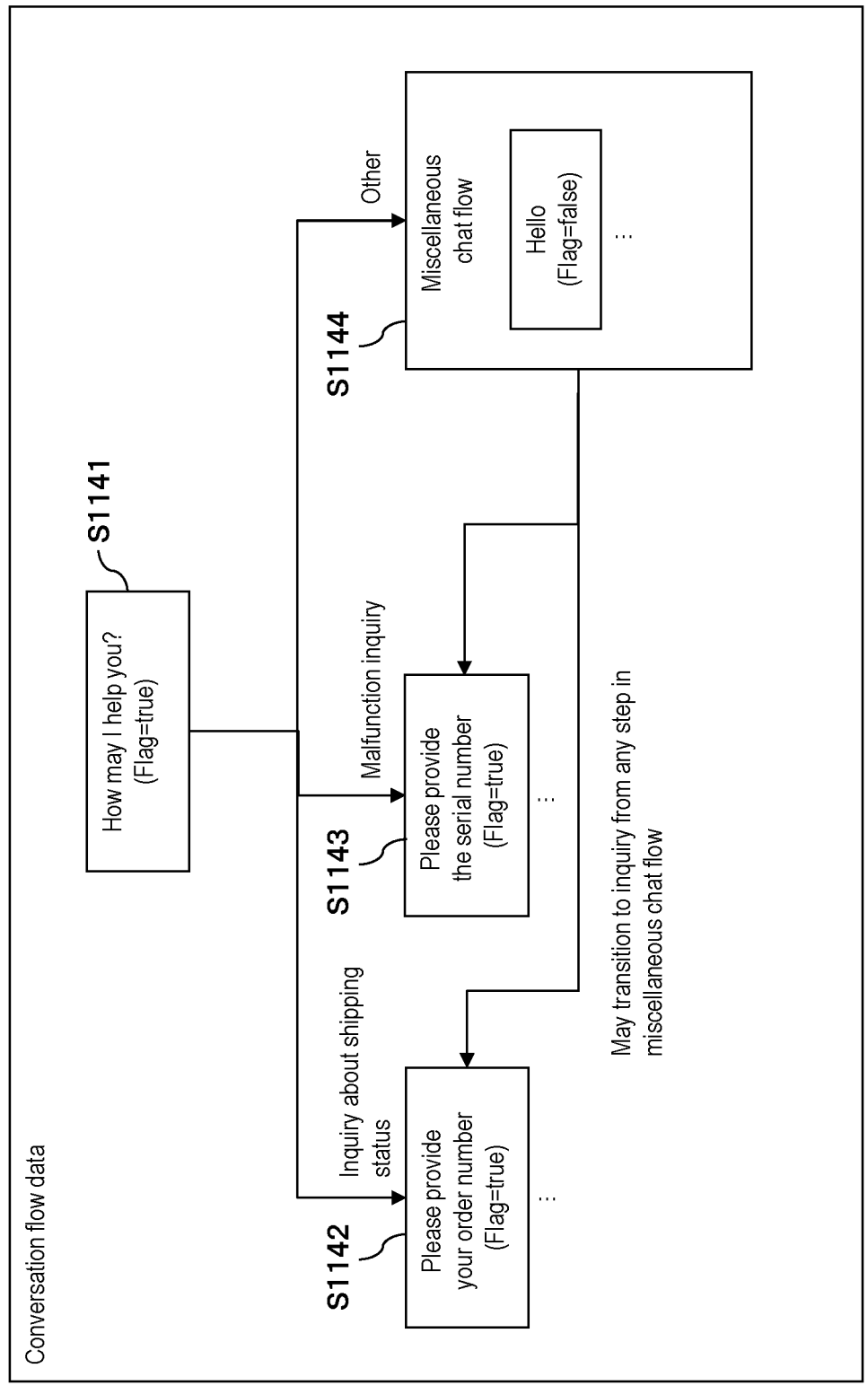

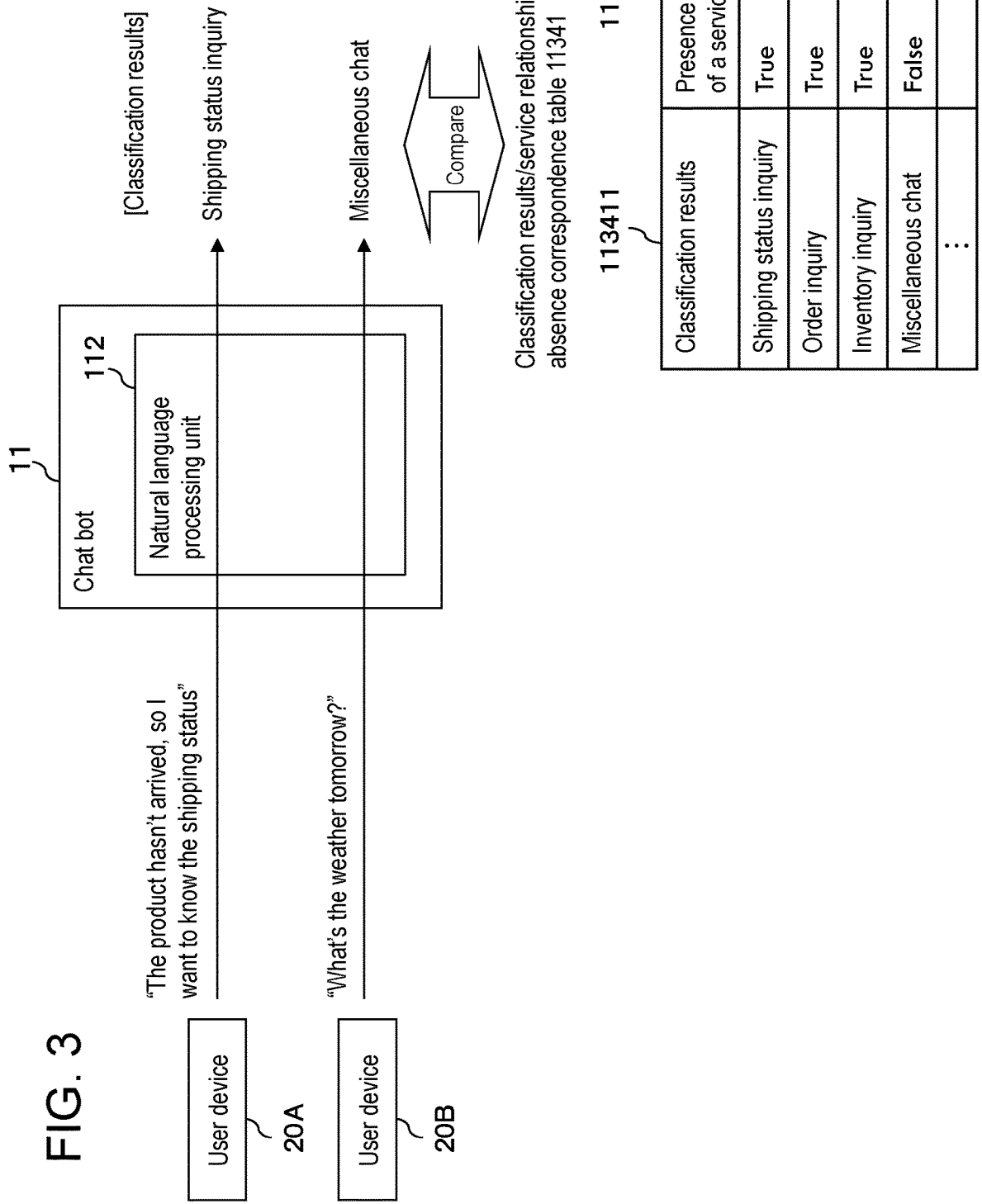

FIG. 4

(a) Number of conversations record table 11321

| Recording date and time | Number of conversations unrelated to the service menu (A) | Number of conversations related to the service menu (B) |
|---|---|---|
| 2017/12/25 10:00:00 | 100 | 500 |
| 2017/12/25 10:00:10 | 300 | 510 |
| 2017/12/25 10:00:20 | 600 | 520 |
| ... | ... | ... |

113211  113212  113213

(b) Number of conversations prediction table 41511

| Number of conversations unrelated to the service menu (A) | Number of conversations related to the service menu (B) |
|---|---|
| 1000 | 500 |

415111  415112

(c) Resource allocation condition table for the chat bot 41531

| Total number of conversations (A+B) | Resource template ID |
|---|---|
| 0~1000 | t1 |
| 1001~3000 | t2 |
| 3001~5000 | t3 |
| ... | ... |

415311  415312

(d) Resource allocation condition table for the back-end system 41532

| Number of conversations related to the service menu (B) | Resource Template ID |
|---|---|
| 0~300 | t2 |
| 301~1000 | t3 |
| 1001~3000 | t4 |
| ... | ... |

415321  415322

(e) Resource template table 41521

| ID | Number of virtual CPUs | Memory amount | Storage type |
|---|---|---|---|
| t1 | 1 | 1 GB | HDD |
| t2 | 2 | 4 GB | HDD |
| t3 | 4 | 16 GB | SSD |
| t4 | 8 | 32 GB | SSD |
| ... | ... | ... | ... |

415211  415212  415213  415214

(f) Resource allocation table 41541

| System ID | Resource template ID |
|---|---|
| ChatBot | t1  ⇧ t2 |
| Authentication | t2  ⇧ t3 |
| UserManagement | t2  ⇧ t3 |
| ... | ... |

415411  415412

Values after allocation modification

FIG. 6

Conversation scenario table 11331

| Message intent (113311) | Conversation Step ID (113312) | Response message (113313) | Back-end system call necessity (113314) | Back-end system identifier (113315) | Presence or absence of a relationship to service menu (113316) | Next conversation step (113317) |
|---|---|---|---|---|---|---|
| Conversation start | 0 | How may I help you? | false | null | true | null |
| Shipping status inquiry | 0 | Please provide your order number. | false | null | true | Shipping status inquiry.1 |
| Shipping status inquiry | 1 | I'll check the shipping status so please wait. | true | Shipping management system | true | Shipping status inquiry.2 |
| Shipping status inquiry | 2 | The shipping status is {status}. | false | null | true | Shipping status inquiry.3 |
| Malfunction inquiry | 0 | Please provide your serial number. | false | null | true | Malfunction inquiry.1 |
| Malfunction inquiry | 1 | What king of trouble are you having? | false | null | true | Malfunction inquiry.2 |
| Malfunction inquiry | 2 | I'll check for a solution so please wait. | true | FAQ System | true | Malfunction inquiry.3 |
| Malfunction inquiry | 3 | Please try {solution}. | false | null | true | Malfunction inquiry.4 |
| Malfunction inquiry | 4 | Has the issue been resolved? | false | null | true | if next_messge == "Yes" End conversation.0 else Malfunction inquiry.5 |
| Malfunction inquiry | 5 | Please send the product to our repair center. The destination address is {Address}. | false | null | true | null |
| Miscellaneous chat | 0 | {random} | false | null | false | null |
| Conversation end | 0 | Thank you for your patronage. | false | null | true | null |
| ... | ... | ... | ... | ... | ... | ... |

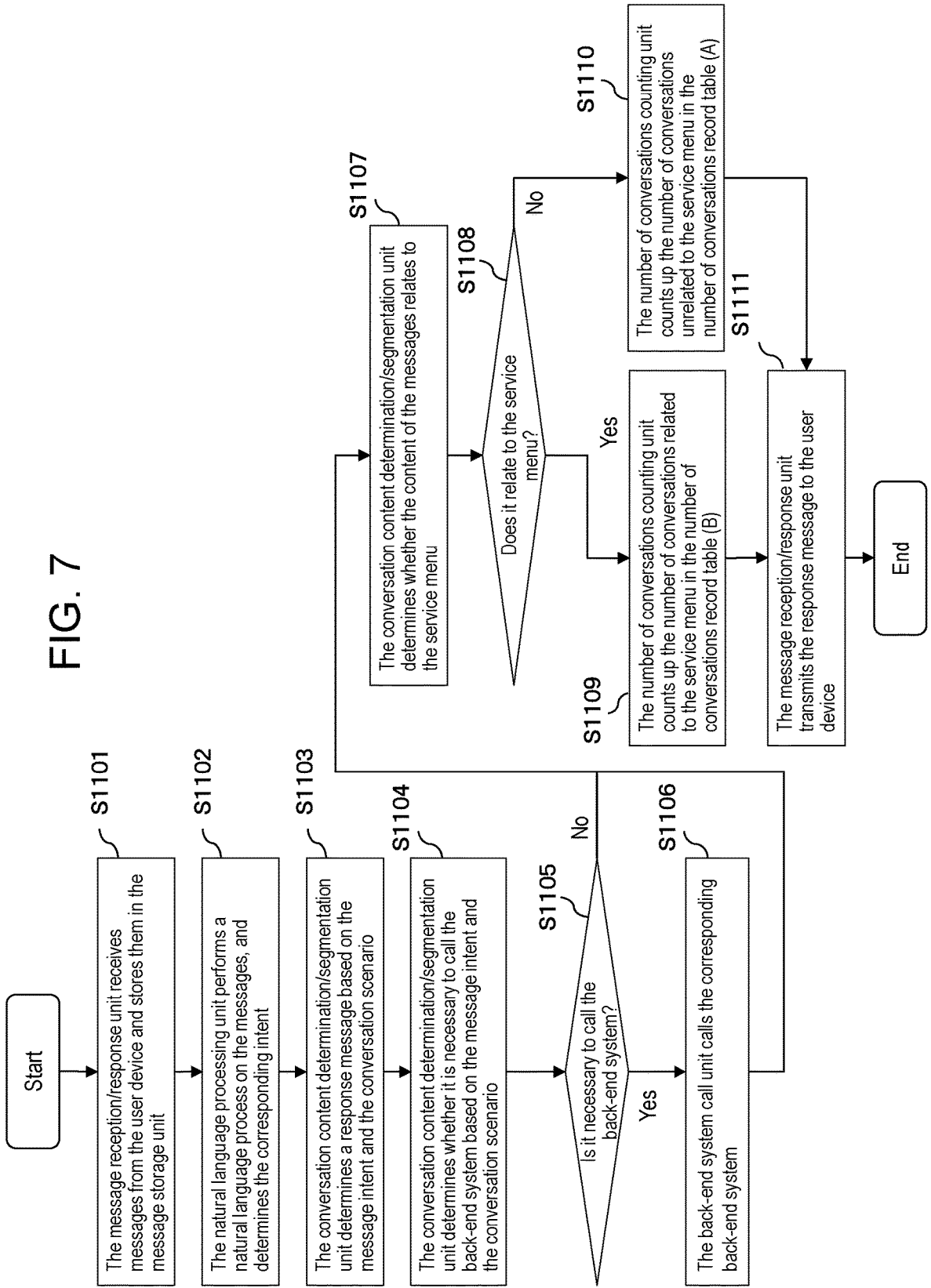

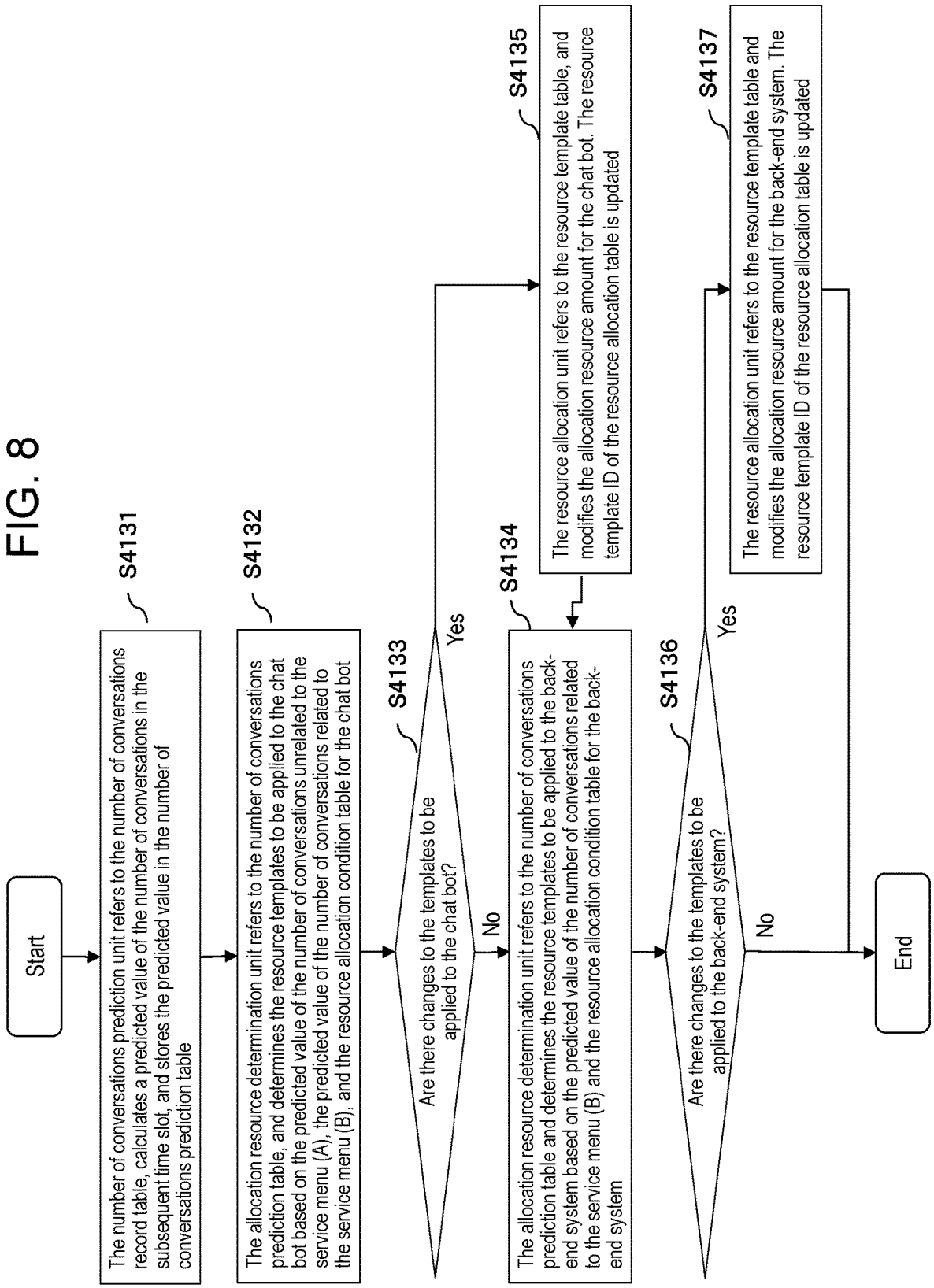

FIG. 10

Number of conversations record table 11321'

| Recording date and time (113211') | Number of conversations unrelated to the service menu (A) (113212') | Number of conversations related to the service menu (B) (113213') | Number of incorrectly recognized conversations (C) (113214') |
|---|---|---|---|
| 2017/12/25 10:00:00 | 100 | 500 | 200 |
| 2017/12/25 10:00:10 | 300 | 510 | 200 |
| 2017/12/25 10:00:20 | 600 | 520 | 100 |
| ... | ... | ... | |

Resource allocation condition table for the chat bot 41531'

| Total number of conversations (A+B+C) (415311') | Resource template (415312') |
|---|---|
| 0~1000 | t1 |
| 1001~3000 | t2 |
| 3001~5000 | t3 |
| ... | ... |

Number of conversations prediction table 41511'

| Number of conversations unrelated to the service menu (A) (415111') | Number of conversations related to the service menu (B) (415112') | Number of incorrectly recognized conversations (C) (415113') |
|---|---|---|
| 1000 | 500 | 100 |

FIG. 14

Resource allocation upper limit table 41561

| System ID | Number of virtual CPUs | Memory amount |
|---|---|---|
| Total | 10 | 36 GB |
| ChatBot1 | 8 | 32 GB |
| ChatBot2 | 4 | 16 GB |
| ... | ... | ... |

Number of conversations per user record table 11322

| User ID 113221 | Recording date and time 113222 | Number of conversations unrelated to the service menu (A) 113223 | Number of conversations related to the service menu (B) 113224 |
|---|---|---|---|
| User 1 | 2017/12/25 10:00:00 | 2 | 5 |
| User 1 | 2017/12/25 10:05:00 | 3 | 10 |
| User 1 | 2017/12/25 10:10:00 | 1 | 10 |
| User 2 | 2017/12/25 11:00:00 | 10 | 1 |
| User 2 | 2017/12/25 11:10:00 | 20 | 2 |
| User 2 | 2017/12/25 11:20:00 | 30 | 1 |
| | ... | ... | ... |

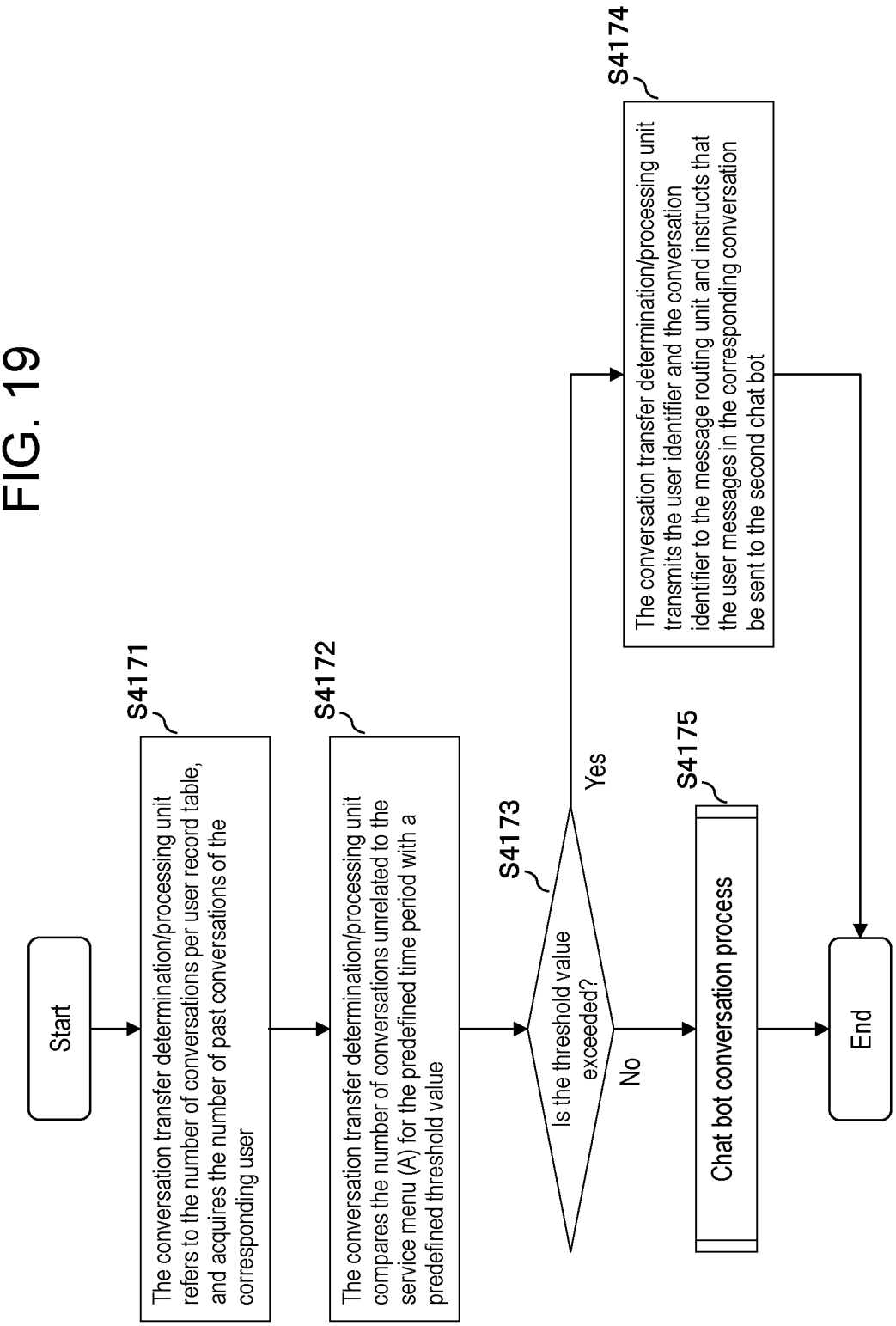

ALLOCATION RESOURCE FOR CHAT BOT BASED ON CONVERSATIONS RELATED OR UNRELATED TO SERVICE MENU

TECHNICAL FIELD

The present invention relates to resource allocation methods and resource allocation systems. Further, more particularly, the present invention relates to a resource allocation method and a resource allocation system for allocating resources in systems that utilize chat bots.

Chat bot systems, including chat bots (also referred to as virtual assistants) that automatically respond to inquiries (for example, inventories, delivery dates, claims, and other inquiries regarding products), make product recommendations, and the like by utilizing automated conversation programs are widely used.

An example of such a chat bot system is Japanese Unexamined Patent Application No. 2009-3533 (Patent Document 1). This publication describes a "chat bot system for automatically responding to questions from a plurality of user devices connected to a network, the chat bot system comprising: a response message generation unit for generating a response message to a user's question; a storage unit including a cache buffer for temporarily storing the generated response message; a response message queuing unit for dividing the response message into utterance cache elements and queuing and storing the utterance cache elements when the response message is equal to or longer than a predetermined length in the cache buffer for channels assigned to each user; and a response message presentation unit for presenting the utterance cache elements of the response message divided and stored in the cache buffer with respect to a user utterance at appropriate time intervals."

In addition, U.S. Pat. No. 9,817,690B2 (Patent Document 2) discloses a technique for managing cloud computing resources. This publication discloses a resource allocation technique based on a load tendency.

CITATION LIST

Patent Literature

[Patent Document 1] Japanese Unexamined Patent Application No. 2009-3533
[Patent Document 2] U.S. Pat. No. 9,817,690B2

SUMMARY OF INVENTION

Technical Problem

Patent Document 1 does not consider the allocation of chat bot resources. Accordingly, it is only possible to provide a chat system for efficiently caching and presenting long-form response messages to a plurality of users as a means of achieving customer satisfaction. In addition, by using the resource allocation technique described in Patent Document 2, it is possible to change the resource allocation of chat bots and back-end-systems based on the load tendency of the chat bot. However, in the related art, there is a problem in that the cause of the increase in the load of the chat bot is not considered, and even when the user engages in conversations unrelated to the service menus, this is regarded as an increase in the load, and back-end resources are increased.

Accordingly, it is an object of the present invention to provide a technique capable of appropriately allocating resources to systems such as chat bots and back-end-systems even when a user is engaged in conversations (such as text messages and speech messages) unrelated to service menus, without increasing the resources of the chat bots and back-end-systems.

Solution to Problem

In order to solve the above-mentioned problems, one representative resource allocation method and resource allocation system according to the present invention relates to a resource allocation method for allocating resources to a chat bot configured to automatically respond to a message-based inquiry from a user and a back-end system operating in cooperation with the chat bot, the resource allocation method comprising a conversation content determination/classification step of determining and classifying whether a conversation via messages between the user and the chat bot is a conversation related to a service menu or a conversation unrelated to a service menu, a number of conversations counting step of counting a number of conversations related to the service menu and a number of conversations unrelated to the service menu, an allocation resource determination step of determining an allocation resource amount for the chat bot based on an increase or decrease in a first number of conversations related to the service menu and a second number of conversations unrelated to the service menu as counted in the number of conversations counting step, and determining an allocation resource amount for the back-end-system based on an increase or decrease in the first number of conversations, and a resource allocation step of allocating the resource amounts determined in the allocation resource determination step to the chat bot and the back-end system.

BRIEF DESCRIPTION OF DRAWINGS

FIG. 2 is a diagram for explaining a determination method of the presence or absence of a relationship between conversation flow data (conversation scenario data) and a service.

FIG. 3 is a diagram for explaining another determination method of the presence or absence of a relationship between conversation flow data (conversation scenario data) and a service.

FIG. 4 is a diagram for explaining an example of the resource allocation method of the present invention in which resources are allocated to a resource allocation table using a number of conversations record table, a number of conversations prediction table, a chat bot resource allocation condition table, a back-end-system resource allocation condition table, and a resource template table.

FIG. 6 is a diagram illustrating a data configuration example of the conversation scenario table according to the first embodiment.

FIG. 7 is a flowchart for explaining a chat bot conversation process of the first embodiment.

FIG. 8 is a flowchart for explaining a resource allocation modification process according to the first embodiment.

FIG. 10 is a diagram illustrating a configuration example of the number of conversations record table, the number of conversations prediction table, and a resource allocation condition table for the chat bot according to the second embodiment.

FIG. 14 is a diagram illustrating a data configuration of a resource allocation upper limit table according to the third embodiment.

FIG. 18 is a diagram illustrating a configuration example of a number of conversations per user record table according to the third embodiment.

FIG. 19 is a flowchart for explaining an initial routing determination process of a conversation according to the third embodiment.

First, an overview of the present invention will be described with reference to FIG. 1 to FIG. 4.

Figure 1:
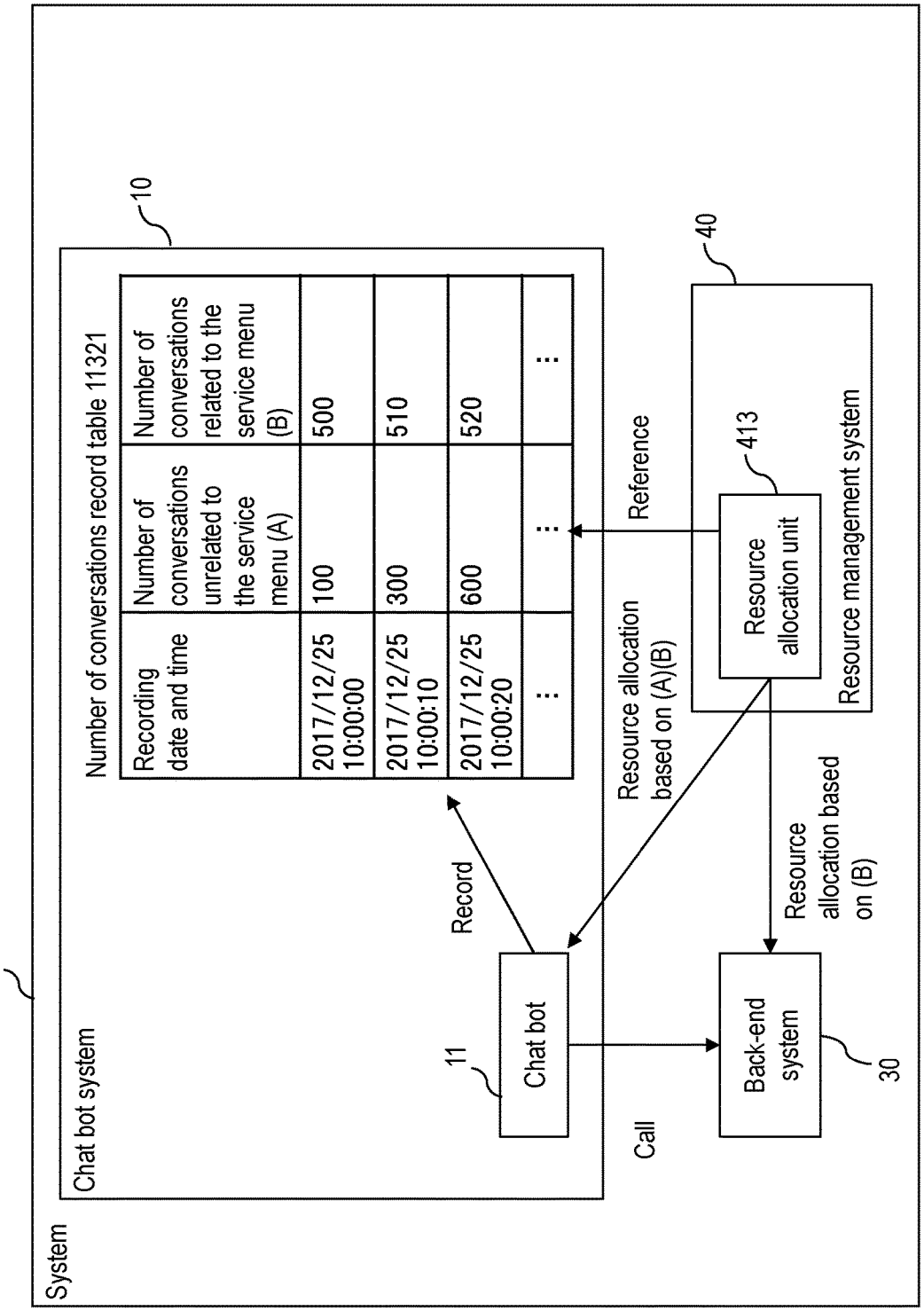
FIG. 1 is a block diagram for explaining the schematic configuration of a system including a chat bot of a chat bot system, a back-end system, and a resource allocation unit of a resource management system, according to the present invention.

FIG. 1 is a block diagram illustrating a schematic configuration of a system 1 including a chat bot 11 of a chat bot system 10, a back-end-system 30, and a resource allocation unit 413 of a resource management system 40 according to the present invention, and serves as a diagram for explaining the allocation of resources to the chat bot 11 and the back-end-system 30 by the resource allocation unit 413.

The chat bot system 10 has a function for counting the number of conversations related to a service menu (B) and the number of conversations not related, that is, unrelated, to the service menu (A), and recording these numbers of conversations (A) and (B) together with the recording date and time in the number of conversations record table 11321 of the number of conversations storage unit 1132 (which will be described later), and a function for calling the back-end-system 30.

The back-end-system 30 is a system having a function for performing a desired back-end operational process in response to a call from the chat bot 11 or an input/instruction from the front end, and outputting a result of this process. In addition, the back-end-system 30 is a system that includes, for example, a user management system, a sales management system, and other systems, and handles user information, sales information, and the like.

The resource management system 40 has a function of managing resources, such as for the chat bot 11 and the back-end-system 30, and allocating resources to the chat bot 11 and the back-end-system 30 based on the information of the number of conversations record table 11321 of the number of conversations storage unit 1132, which will be described later.

FIG. 2 is a diagram for explaining an example of a determination method of the presence or absence of a relationship with a service in conversation flow data in the chat bot 11 when the resource allocation unit 413 performs resource allocation control, and serves as a diagram for explaining a relationship between the conversation flow data and a flag for distinguishing whether or not there is a relationship with a service menu.

In the case that Step S1141 indicates conversational flow data including response data of, for example "How may I help you?" a "true" flag is defined in this step, in the case that Step S1142 indicates response data of "Please provide your order number" in a user's inquiry about shipping status, a "true" flag is defined in this step, in the case that Step S1143 indicates response data of "Please provide the serial number" in a malfunction inquiry, a "true" flag is defined in this step, and in the case that Step S1144 of the conversation flow indicates other miscellaneous issues, a "false" flag is defined in this step.

FIG. 3 is a diagram for explaining another determination method of the presence or absence of a relationship between conversation scenario data (see FIG. 6) and a service, according to the present invention.

As another determination method of the presence or absence of a relationship with a service, as illustrated in FIG. 3, the relationship of the presence or absence of a relationship between classification results (such as shipping status inquiries) based on natural language processing (which may be a well-known technique) that serves as part of the chat bot functionality of the chat bot 11 and a service may be determined by using a table 11341 (see FIG. 3) of a classification results/service relationship presence or absence correspondence storage unit 1134, which will be described later.

That is, the present embodiment relates to a determination method in which a classification results/service relationship presence or absence correspondence table 11341 is prepared that provides a result of "true" indicating a relationship with the service for a case that the classification result of natural language processing with respect to a user message from a user device 20 of "The product hasn't arrived, so I want to know the shipping status" is "shipping status inquiry," "order inquiry," or "inventory inquiry," and that provides a result of "false" indicating no relationship with a service for a case that the classification result of natural language processing with respect to a user message of "What's the weather tomorrow" is "miscellaneous inquiry," and the presence or absence between the classification result and the service is compared.

FIG. 4(a)-FIG. 4(f) illustrate an example of a resource allocation method of the present invention.

With regard to the resource allocation method for the chat bot 11 and the back-end-system 30 by the resource allocation unit 413, as illustrated in FIG. 4(a)-FIG. 4(f), for example, a number of conversations prediction record table 11321, a number of conversations prediction table 41511, a resource allocation condition table 41531 for the chat bot 11, a resource allocation condition table 41532 for the back-end-system 30, a resource template table 41521, and a resource allocation table 41541 are prepared.

Then, based on the number of conversations record table 11321, predicted values (1000,500) for the number of conversations related to the service menu (B) and the number of conversations unrelated to the service menu (A) in the following time slot are calculated, and these predicted values are stored in the number of conversations prediction table 41511.

As a method of calculating the predicted values of the number of conversations, an existing statistical method or a method using machine learning may be used, and the method used herein is not particularly limited.

It should be noted that the process of calculating the predicted values of the number of conversations related to the service menu (B) and the number of conversations unrelated to the service menu (A) may be omitted, and a sum of the number of conversations related to the service menu (B) and the number of conversations unrelated to the service menu (A) in a predetermined period may be used instead. The method of using the predicted values for resource allocation is a method of allocating resources in advance based on a prediction of an increase or decrease of the number of future conversations. On the other hand, the method of using a sum for resource allocation is a method of allocating resources based on an increase or decrease of the number of past conversations.

Next, for the chat bot 11, a resource template (t2) is determined from the sum (1500) of the predicted values of the conversations related to the service menu (B) and the number of conversations unrelated to the service menu (A) in the number of conversations prediction table 41511, the resource allocation condition table 41531 for the chat bot 11 (total number of conversations (A+B): 1001 to 3000, resource template: t2), and the resource template table 41521 (ID:t2, number of virtual CPUs: 2, memory amount: 4 GB, storage type: HDD), and, for example, the resources (number of virtual CPUs: 2, memory amount: 4 GB, storage type: HDD) defined in the resource template table 41521 (ID: t2) are assigned to the chat bot (system ID: ChatBot), and the template of the resource assignment table 41541 is changed from t1 to t2.

On the other hand, for the back-end-system 30, a resource template (ID: t3) is determined from the predicted value (500) of the number of conversations related to the service menu (B) in the number of conversations prediction table 41511, the resource allocation condition table 41532 for the back-end-system 30 (number of conversations related to the service menu (B): 301 to 1000), and the resource template table 41521, and based on this template, the resource allocation in the resource allocation table 4155 for the back-end system (a system with a system ID other than ChatBot) is changed from t2 to t3, and the resources (number of virtual CPUs: 4, amount of memory: 16 GB, storage type: SSD) defined in the resource template table 41521 (ID:t3) is allocated.

Here, the resource allocation condition table 41532 for the back-end-system 30, which differs for each back-end-system 30, may be provided to perform finer allocation control.

First Embodiment

Next, specific examples of the present invention will be described.

Figure 5:
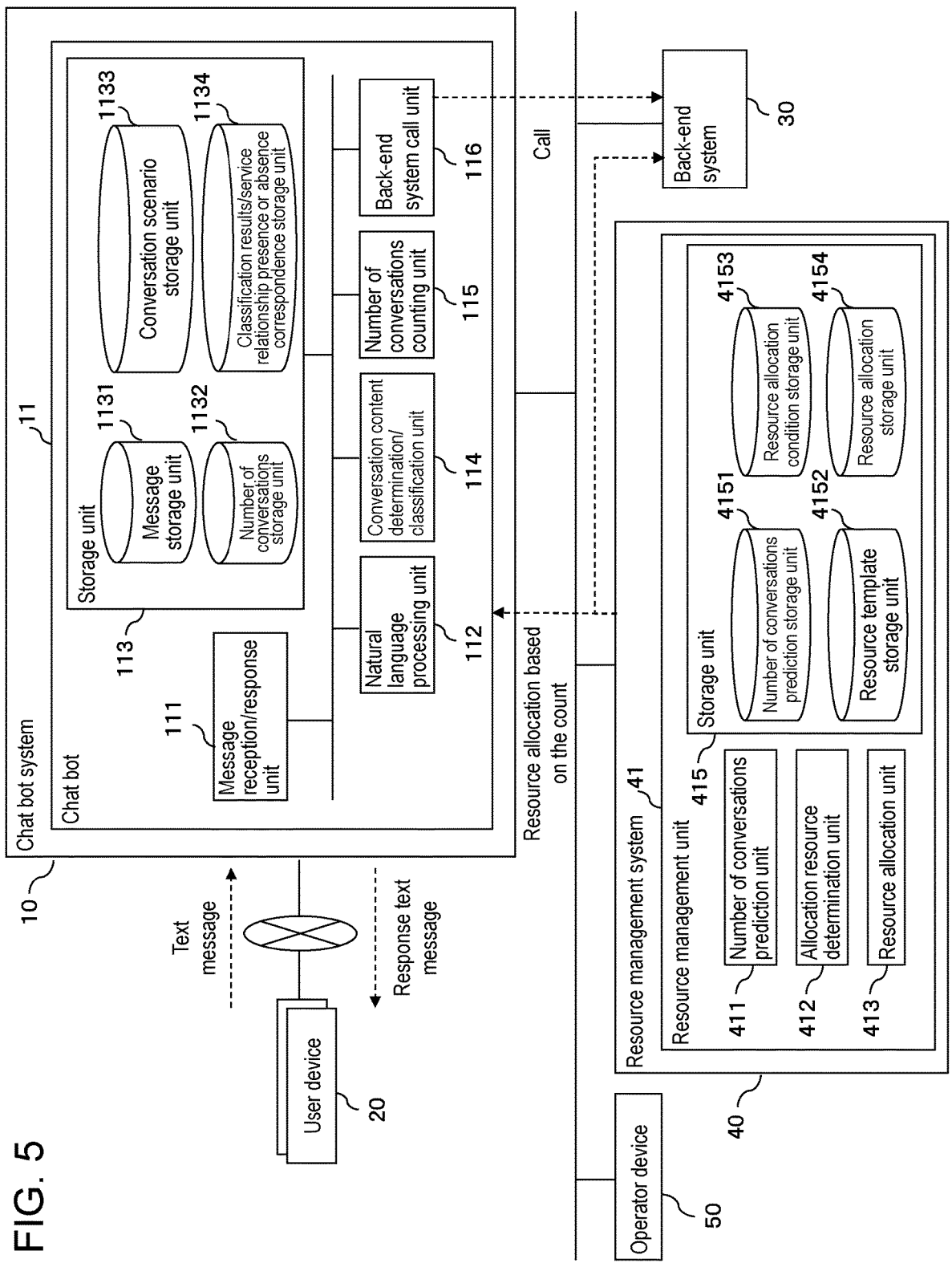
FIG. 5 is a block diagram illustrating a configuration of the resource allocation system according to the first embodiment of the present invention.

FIG. 5 is a block diagram illustrating the configuration of the resource allocation system according to the first embodiment of the present invention.

The resource allocation system 1 includes a chat bot system 10, a resource management system 40, and a back-end-system 30.

The chat bot system 10 includes a chat bot 11 connected to a user device 20 via a network.

The chat bot 11 includes an automatic conversation engine having an automatic answering response function for returning natural answers and chat in response to textual messages entered by the user with the user device 20.

The automatic conversation engine is an engine for returning a response text message such as a natural answer or a chat in response to a text message input by a user.

The chat bot 11 includes a message reception/response unit 111, a natural language processing unit 112, a storage unit 113, a conversation content determination/classification unit 114, a number of conversations counting unit 115, a back-end call unit 116, and the like.

The message reception/response unit 111 has a function for receiving a text message from the user device 20 and responding to the text message.

As described above, the natural language processing unit 112 has a function of performing natural-language processing on text messages from the user device 20 and outputting the processing results as classification results (shipping status inquiry, ordering inquiry, inventory inquiry, etc.).

The storage unit 113 includes: a message storage unit 1131; a number of conversations storage unit 1132; a conversation scenario storage unit 1133; and a classification results/service relationship presence or absence correspondence storage unit 1134.

The message storage unit 1131 includes a message storage table 11311 for storing a response message or the like.

The number of conversations storage unit 1132 includes a number of conversations storage table 11321 (see FIG. 4a) that stores a recording date and time 113211, the number of conversations unrelated to the service menu (A) 113212, and the number of conversations related to the service menu (B) 113213.

The conversation scenario storage unit 1133 includes a conversation scenario table 11331 (see FIG. 6) that stores various information for a conversation scenario such as a message intent 113311, a conversation step ID113312, a response message 113313, a back-end-system call necessity 113314, a back-end-system identifier 113315, presence or absence of a relationship with service menu 113316, a next conversation step 113317, and the like.

The classification results/service relationship presence or absence correspondence storage unit 1134 includes a classification results/service relationship presence or absence correspondence table 11341 (see FIG. 3) for storing information indicating the correspondence relationship between the classification results of the natural-language process and the presence or absence of a service relationship.

For example, the conversation content determination/classification unit 114 determines, for text messages from the user device 20, the presence or absence of a relationship with the service menu based on the conversation scenario table 11331 (see FIG. 6). For example, if the result of performing the natural-language process on the text message from the user device 20 is "shipment status inquiry," the chat bot responds to the user device 20 with a response message 113313 ("Please provide your order number") of the row indicated by a message intent 113311="shipping status inquiry", and a conversation step ID113312=0 of the conversation scenario table 11331. At this time, this conversation (the exchange of a message with the user device 20 and the response message) is determined to be a conversation related to the service menu based on the presence or absence of a relationship with the service menu 113316 (true) for the corresponding row, and the conversation is classified.

The resource management system 40 includes a number of conversations prediction unit 411, an allocation resource determination unit 412, a resource allocation unit 413, a storage unit 415, and the like. In addition, the resource management system has a function of referring to the number of conversations related to the service menu (B) and the number of conversations unrelated to the service menu (A) of the number of conversations prediction table 41511, control resource allocations to the chat bot 11 based on the number of conversations (B) and the number of conversations (A), and also control resource allocation to the back-end-system 30 based on the number of conversations (B).

The number of conversations prediction unit 411 has a function for predicting a future number of conversations based on the number of conversations related to the service menu (B) and the number of conversations unrelated to the service menu (A) in the number of conversations record table 4151.

The allocation resource determination unit 412 has a function for determining resource allocations for the chat bot 11 and the back-end-system 30 based on the number of conversations prediction table 41511 in the storage unit 415, the resource allocation condition table 41531 for the chat bot 11, the resource allocation condition table 41532 for the back-end-system 30, the resource templates 41521, and the like.

The resource allocation unit 413 has a function for allocating resources to the chat bot 11 and the back-end-system 30 based on the resource allocation table 41541 in the resource allocation storage unit 4154.

Details of these functions will be described later with reference to specific embodiments.

The resource storage unit 415 includes a number of conversations prediction table 41511 as illustrated in FIG. 4, a resource allocation condition table 41531 for the chat bot, a resource allocation condition table 41532 for the back-end-system, a resource template table 41521, and a resource allocation table 41541.

The number of conversations prediction table 41511 includes areas for storing the number of conversations related to the service menu (B) and the number of conversations unrelated to the service menu (A).

The resource allocation condition table 41531 for the chat bot includes areas for storing the total number of conversations (A+B) and the resource template IDs.

The resource allocation condition table 41532 for the back-end-system includes areas for storing the number of conversations related to the service menu (B) and the resource templates IDs.

The resource template table 41521 includes areas for storing IDs, the number of virtual CPUs, the memory amount, and the storage type. In addition, the resource template table 41521 may have an area for storing information regarding other resources such as a network bandwidth.

The resource allocation table 415411 includes an area for storing a system ID and a resource template ID.

The operator device 50 is, for example, a device by which an operator answers an inquiry that cannot be automatically answered by the chat bot 11.

FIG. 6 is a diagram illustrating data configuration example of the conversation scenario table 11331 in the conversation scenario storage unit 1133. It should be noted that the structure of the conversation scenario data may be a table or any other structure. In addition, conversational scenarios need not be provided as data, but may be implemented as chat bot programs.

The conversation scenario table 11331 includes areas for storing a message intent 113311, a conversation step ID113312, a response message 113313, a backend call necessity 113314, back-end-system identifiers 113315, presence or absence of a relationship with the service menu 113316, and a next conversation step 113317.

The message intent 113311 is information to be compared with the result of the natural-language process on the message sent from the user device 20, and includes, for example, "conversation start," "shipping status inquiry," "malfunction inquiry," "chat," "conversation end," and the like.

The conversation step ID113312 indicates the position of a conversation step in a conversation scenario, and is, for example, a numeral such as "0" to "5". In the example of FIG. 6, the combination of the message-intent 113311 and the conversation step ID113312 allows the location of a conversation step within a conversation scenario to be uniquely identified.

The response message 11333 is a message to be returned as a response to the message sent from the user device 20, and may include, for example "How may I help you?", "Please tell us your order", "I'll check the shipping status, so please wait, "The shipping status is {Status}," "Please provide your serial number," "What kind of trouble are you having?", "I'll check for a solution, so please wait." "Try {Solution}," "Has the issue been resolved?", "Please send the product to our repair center. The destination address is {Address}.", "Thank you for your patronage." and the like.

In the example of FIG. 6, the variables enclosed by { } included in the response message 11333 store information obtained as a result of calling the back-end-system. For example, the variable {Status} of the response message "The shipping status is {Status}." stores information on the shipment status acquired from the shipment control system, which serves as the back-end-system, and then the information is transmitted to the user device 20.

The backend call necessity 11334 is information that indicates whether or not calling of the backend service is necessary. The relationship with the service menu 11336 indicates whether or not the conversation with the user is related to the service menu. The backend call necessity 11334 and the relationship with the service menu 11336 may be "false," "true," or the like. In the example of FIG. 6, when the value of the backend call necessity 11314 is "false," this indicates that there is no need to call the back-end service, and when the value is "true," this indicates that a back-end service call is required. In addition, similarly, if the value of the relationship with the service menu 11336 is "false," this indicates that the conversation with the user is not related to the service menu, and when the value is "true," this indicates that the conversation with the user is related to the service menu.

The back-end-system identifiers 11335 are information for uniquely specifying the back-end-system, and include, for example, "null", "shipping management system", "FAQ system", and the like. In the example of FIG. 6, when the value of the back-end call necessity 11314 is "false," the value of the back-end-system 11335 is "null." This indicates that, if no back-end-system call is required, there is no back-end-system to be called. When the value of the back-end call necessity 11314 is "true," the back-end-system 11335 includes information for uniquely identifying the back-end-system to be called (for example, "shipping management system", "FAQ system," or the like).

The next conversation step 11337 uniquely identifies the position of the next conversation step in a conversation scenario, and may include "null," "shipping status inquiry.1," "Fault inquiry.1," "if next_message==="Yes", and "finish conversation.0." The values for the next conversation step 113317 can be compared with a value obtained by concatenating the message intent 113311 and the conversation step ID 113312 with the "." symbol.

The example of FIG. 6, for example, indicates that the next conversation step of message intent 113311="shipment status inquiry," and conversation step ID=0 is indicated by the step of message intent 113311=shipment status inquiry, and conversation step ID=1.

FIG. 7 is a flowchart for explaining a conversation process by the message reception/response unit 111, the natural language processing unit 112, the conversation content determination/classification unit 114, the number of conversations counting unit 115, the back-end-system call unit 116, and the like of the chat bot 11, according to the first embodiment. This process is executed each time the chat bot 11 receives a text message from the user device 20.

The operations based on the flowchart of FIG. 7 are as follows.

Step S1101:

In the message reception/response unit 111, the chat bot 11 receives messages from the user device 20, stores them in the message storage unit 1131 of the storage unit 113, and saves them.

Step S1102:

In the natural language processing unit 112, the chat bot 11 performs a natural-language process on the message from the user device 20, and determines the intent of the message (see FIG. 3).

Step S1103:

In the conversation content determination/segmentation unit 114, the chat bot 11 determines a response message based on the intent of the message and the conversation scenario.

Step S1104:

In the conversation content determination/segmentation unit 114, the chat bot 11 determines whether or not it is necessary to call the back-end-system based on the intent of the message and the conversation scenario.

Step S1105:

As a result of the call necessity determination of the back-end-system in Step S1104, the chat bot 11 proceeds to Step S1106 when the call of the back-end-system is "necessary" (Yes), and proceeds to Step S1106 when the call is "unnecessary" (No).

Step S1106:

In the back-end system call unit 116, the chat bot 11 calls the corresponding back-end-system. The method of calling the back-end-system may include, but is not limited to, a method of calling an API of the corresponding back-end-system.

Step S1107:

In the conversation content determination/classification unit 114, the chat bot 11 determines whether the content of the messages relates to the service menu.

This step may be determined on the basis of the "relationship with the service menu" in the conversation scenario table 11331. Alternatively, this step may be determined based on the classification results/service relationship presence or absence correspondence table 1133 that indicates the presence or absence of a relationship between the results of the natural language process (the classification results) of the user messages and the service (see FIG. 3).

Step S1108:

As a result of the relationship determination with the service menu in Step S1107, the chat bot 11 proceeds to Step S1109 when there is a relationship (Yes), and proceeds to Step S1100 when there is no relationship (No).

Step S1109:

The number of conversations counting unit 115 of the chat bot 11 counts up the number of conversations related to the service menu (B) of the number of conversations record table 11321.

Step S1110:

The number of conversations counting unit 115 of the chat bot 11 counts up the number of conversations unrelated to the service menu (A) of the number of conversations record table 11321.

Step S1111:

In the message reception/response unit 111, the chat bot 11 transmits the response message determined in the Step S1103 to the user device 20.

FIG. 8 is a flow chart illustrating a resource allocation modification process performed by the number of conversations prediction unit 411, the allocation resource determination unit 412, the resource allocation unit 413, and the like in the resource management unit 41. In the present embodiment, this processing is periodically executed independently of the conversation processing between the user and the chat bot 11. As a trigger for executing this process, a specific event (for example, an event such as an insufficient resource alert of the chat bot 11 or the back-end-system 30) may be received as a trigger, or an administrator of the chat bot 11 or the back-end-system 30 may manually execute the processing, but the present invention is not particularly limited herein.

The operations based on the flowchart of FIG. 8 are as follows.

Step S4131:

The number of conversations prediction unit 411 refers to the number of conversations record table 11321, calculates a predicted value of the number of conversations in the subsequent time slot, stores the predicted value in the number of conversations prediction table 41511 (see FIG. 4b), and saves the predicted value.

Step S4132:

The allocation resource determination unit 412 refers to the number of conversations prediction table 41511, and determines the resource templates to be applied to the chat bot 11 based on the predicted value of the number of conversations unrelated to the service menu (A), the predicted value of the number of conversations related to the service menu (B), and the resource allocation condition table 41531 for the chat bot 11 (see FIG. 4).

Step S4133:

As a result of Step S4132, it is determined whether or not there is a change in the templates to be applied to the chat bot 11, and if there is no change (No), the process proceeds to Step S4134, and if there is a change (Yes), the process proceeds to Step S4135.

Step S4134:

The allocation resource determination unit 412 refers to the number of conversations prediction table 41511, determines the resource templates to be applied to the back-end-system 30 based on the predicted value of the number of conversations related to the service menu (B) and the resource allocation condition table 41532 for the back-end-system 30, and proceeds to Step S4136 (see FIG. 4).

Step S4135:

The resource allocation unit 413 refers to the resource template table 41521, and modifies the allocation resource amount for the chat bot 11 based on the resource template determined in Step S4132. In addition, the resource template ID of the resource allocation table 41541 is updated to the ID of the resource template determined in Step S4132, and the process proceeds to Step S4134.

Step S4136:

As a result of Step S4134, it is determined whether or not there is a change in the templates to be applied to the back-end-system 30, and if there is no change (NO), the process ends, and if there is a change (YES), the process proceeds to step S4137.

Step S4137:

The resource allocation unit 413 refers to the resource template table 41521, and modifies the allocation resource amount for the back-end-system 30 based on the resource template determined in Step S4134. In addition, the resource template ID of the resource allocation table 41541 is updated to the ID of the resource template determined in Step S4134, and the process ends.

Second Embodiment

In this embodiment, in the chat bot 11, the repetitions of conversations caused by misstatements of messages by the user and misperceptions of user messages by the chat bot are counted separately, and are not used for the resource allocation determination of the back-end-system 30. Such misstatements or misperceptions may occur, for example, when messages are exchanged between the user and the chat bot by speech, but the communication method of the present invention is not particularly limited.

Referring now to FIG. 9 to FIG. 12, the following description will discuss the aspects (configurations and steps) that are modified from the first embodiment.

Figure 9:
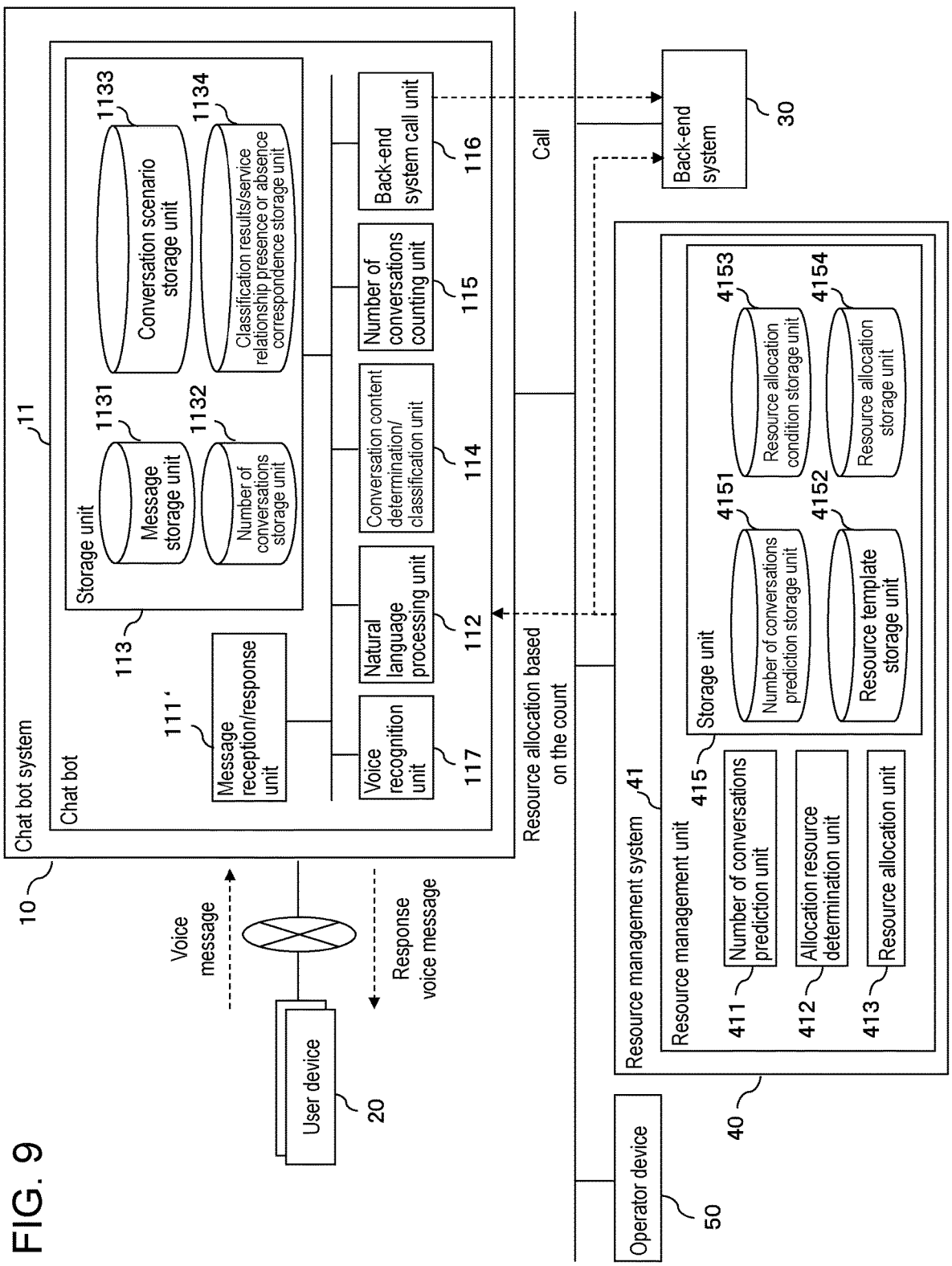
FIG. 9 is a block diagram illustrating a configuration of the resource allocation system according to the second embodiment of the present invention.

FIG. 9 is a block diagram illustrating a configuration of the resource allocation system 1 according to the second embodiment, and only those configurations that differ from those of the first embodiment are described below.

The chat bot 11 comprises a voice message reception/response unit 111' and a voice recognition unit 117 for recognizing speech messages.

FIG. 10 illustrates configuration examples of the number of conversations record table 11321', the number of conversations prediction table 41511', and the resource allocation condition table 41531' for the chat bot 11 of the second embodiment, and only those aspects that differ from those of the first embodiment are shown below.

The number of conversations record table 11321' includes areas for recording the recording date and time, the number of conversations related to the service menu (B), the number of conversations unrelated to the service menu (A), and the number of incorrectly recognized conversations (C). It should be noted that the number of conversations caused by a user's misstatement of a message may also be included in the number of incorrectly recognized conversations (C).

The number of conversations prediction table 41511' further includes areas for recording predicted values of the number of incorrectly recognized conversations (C), and the total number of conversations in the resource allocation condition table 41531' for the chat bot 11 includes the number of incorrectly recognized conversations (C).

In other words, the number of incorrectly recognized conversations (C) is included in the count to determine the allocation of resources to the chat bot 11. However, there is no difference in the resource allocation condition table 41532 for the back-end-system 30 from Example 1. That is, the count of the number of incorrectly recognized conversations (C) is not included in the determination of the allocation of resources for the back-end-system 30.

Figure 11:
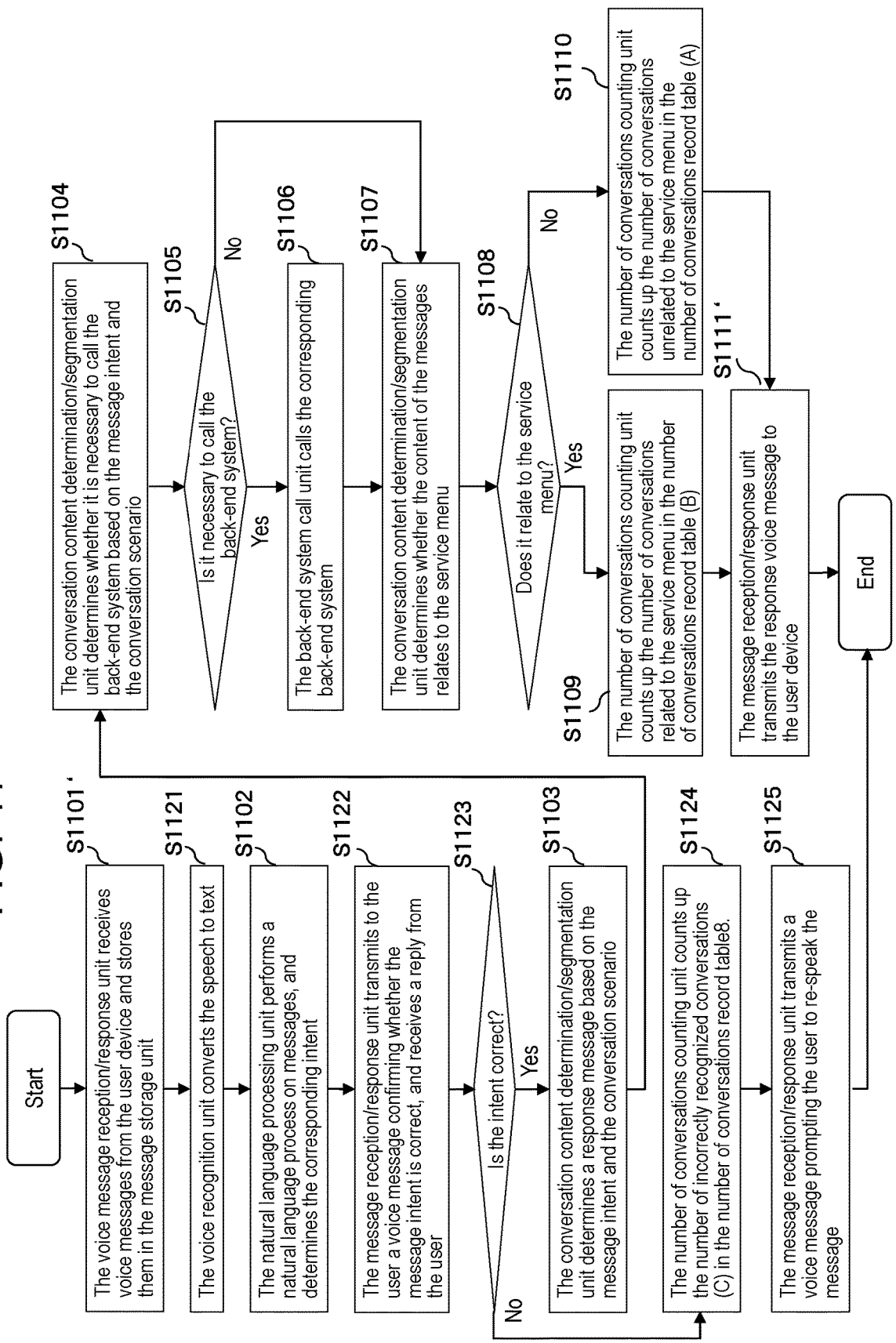
FIG. 11 is a flowchart for explaining the chat bot conversation process according to the second embodiment.

FIG. 11 is a flow chart for explaining the chat bot conversation process according to the second embodiment.

The operations based on the flowchart of FIG. 11 are as follows, and only those steps that have been changed from those of the first embodiment are described below.

Step S1101':

In the voice message reception/response unit 111', the chat bot 11 receives voice messages from the user device 20, stores the voice messages in the message storage unit 1131, and saves the voice messages. It should be noted that instead of storing the audio messages in the message storage unit 1131, messages that have been converted into texts in Step S1121 may be stored.

Step S1121:

After Step S1101', the chat bot 11 converts the speech messages into texts in the voice recognition unit 117. Then, the process proceeds to Step S1102.

Step S1122:

After Step S1102, in the message reception/response unit 111, the chat bot 11 sends an audio message to the user to confirm whether the message intent is correct, and receives a reply from the user.

Step S1123:

The chat bot 11 determines whether the intent of the message is correct. As a result of this determination, if the intent is correct (YES), the process proceeds to Step S1103, and the above-described Steps S1103 to S1111' are sequentially executed. In Step S1111', a response voice message is transmitted to the user device in the voice message reception/response unit 111' and the processing ends.

If the intent is not correct (NO), the process proceeds to Step S1124.

Step S1124:

In the number of conversations counting unit 115, the chat bot 11 counts up the number of incorrectly recognized conversations (C) in the number of conversations record table 11321', and proceeds to Step S1125.

Step S1125:

In the message reception/response unit 111, the chat bot 11 transmits an audio message prompting the user to re-speak the message, and ends the processing.

It should be noted that, in the present embodiment, all or a part of the mutual speech-text conversation may be performed by the user device 20. For example, instead of the user device 20 sending a voice message to the chat bot 11, the user device 20 may convert the voice message to text and send the text message to the chat bot. In addition, instead of sending the response voice message to the user device 20, the chat bot 11 may send a response text message, and the user device 20 may convert the response text message to voice.

Figure 12:
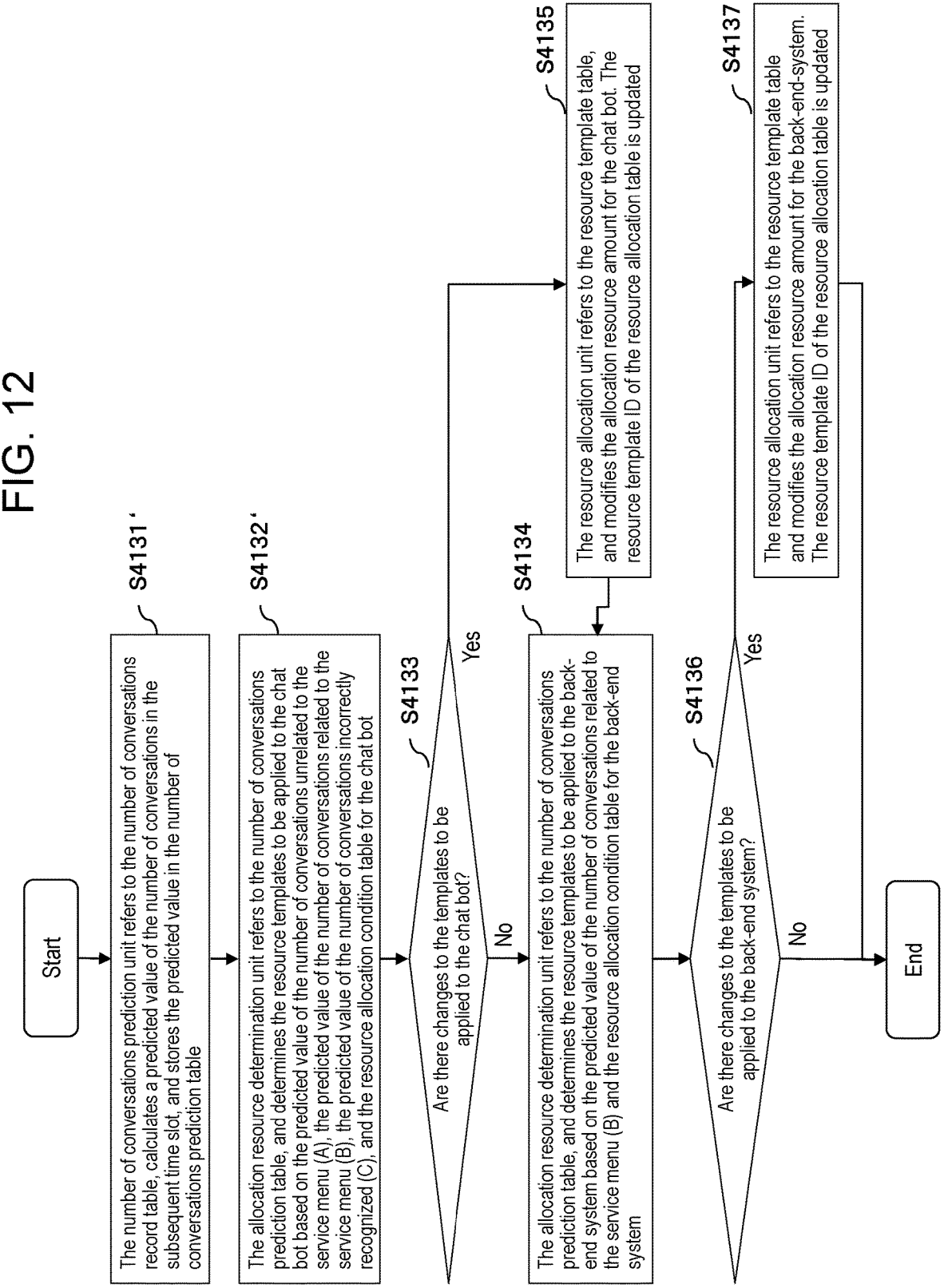
FIG. 12 is a flowchart for explaining the resource allocation modification process according to the second embodiment.

FIG. 12 is a flowchart of the resource allocation modification process according to the second embodiment. The operations based on the flowchart of FIG. 12 are as follows, and only those steps that have been changed from the first embodiment are described below.

Step S4131':

The number of conversations prediction unit 411 refers to the number of conversations record table 11321', calculates the predicted values of the number of conversations (A), (B), and (C) in the next time slot, stores the predicted values in the number of conversations prediction table 41511', and saves them.

Step S4132':

After Step 4131', the allocation resource determination unit 412 refers to the number of conversations prediction table 41511', determines the resource templates to be applied to the chat bot 11 based on the predicted value of the number of conversations unrelated to the service menu (A), the predicted value of the number of conversations related to the service menu (B), the predicted value of the number of conversations incorrectly recognized (C), and the resource allocation condition table 41531' for the chat bot 11 (see FIG. 10), sequentially executes Steps S4133 to S4137, and ends the processing.

Third Embodiment

In the present embodiment, in addition to the chat bot 11 (a first chat bot), another chat bot 11' (a second chat bot), a conversation transfer determination/processing unit 118, and a message routing unit 119 are provided, and conversations unrelated to service menu (A) are dispatched to the second chat bot 11' by the message routing unit 119. In addition, resources are allocated to instances of the second chat bot with lower priorities and lower upper limits than those of the first chat bot 11.

When the number of conversations unrelated to the service menu (A) exceeds a predetermined threshold, an instance of the second chat bot 11' is created, and when the number of conversations unrelated to the service menu (A) falls below the threshold, the instance of the second chat bot is deleted.

Further, for users for which a ratio of the number of conversations unrelated to the service menu (A) exceeds a threshold value in a historical record, responses to text messages from the user device 20 may be made to be handled by the second chat bot 11' from the beginning.

Referring now to FIG. 13 to FIG. 19, the following description will discuss the aspects (configurations and steps) that are modified from the first embodiment.

Figure 13:
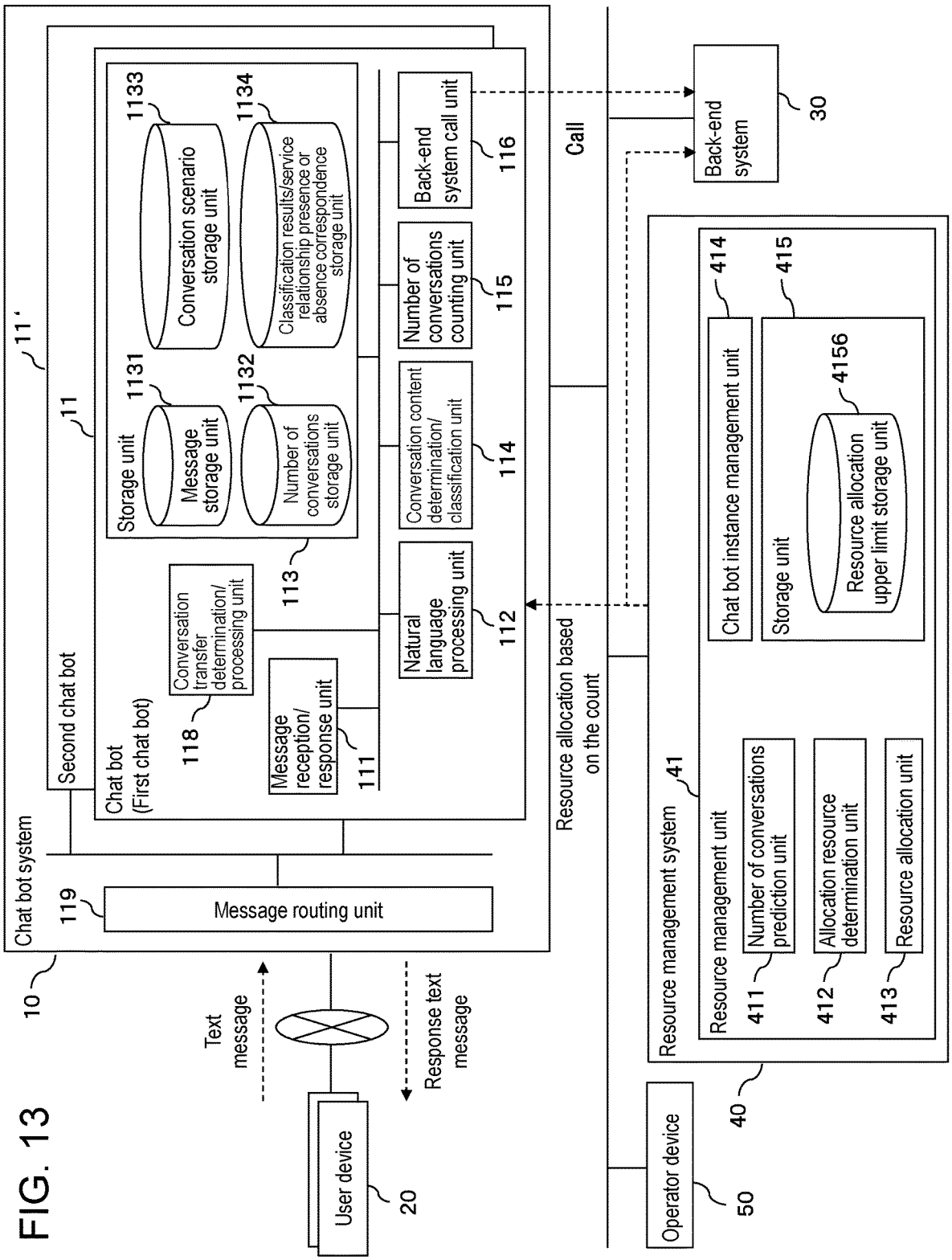
FIG. 13 is a block diagram illustrating the configuration of the resource allocation system according to the third embodiment.

FIG. 13 is a diagram illustrating the configuration of the resource allocation system 1 according to the third embodiment, and only those configurations that differ from those of the first embodiment are described below.

The chat bot system 10 includes a second chat bot 11' and a message routing unit 119. The chat bot 11 includes a conversation transfer determination/processing unit 118. In addition, the resource management unit 41 includes a resource allocation upper limit storage unit 4156 including a chat bot instance management unit 414 and a resource allocation upper limit table 41561.

The configuration of the chat bot 11' may be the same as that of the chat bot 11.

FIG. 14 is a diagram illustrating a data configuration of the resource allocation upper limit table 41561.

The resource allocation upper limit table 41561 maintains resource allocation upper limit values for the entire chat bot and resource allocation upper limit values for each chat bot instance, and includes system IDs, the number of virtual CPUs, and the amount of memory.

In this embodiment, 10 virtual CPUs and 36 GB of memory are set as the upper limit for the entire chat bot (see the row in which system ID="Total"). In addition, in the chat bot instance 1 (corresponding to the chat bot 11 in FIG. 13), the number of virtual CPUs is set to 8 and the memory capacity is set to 32 GB as the upper limits (see the row in which system ID="ChatBot1"). In addition, in the chat bot instance 2 (corresponding to the chat bot 11' in FIG. 13), the number of virtual CPUs is set to 4 and the memory capacity is set to 16 GB as the upper limits (see the row in which system ID="ChatBot2"). That is, in this embodiment, when the maximum resources are allocated to the ChatBot1, the maximum resources can no longer be allocated to the ChatBot2; that is, the maximum resources are exceeded.

Figure 15:
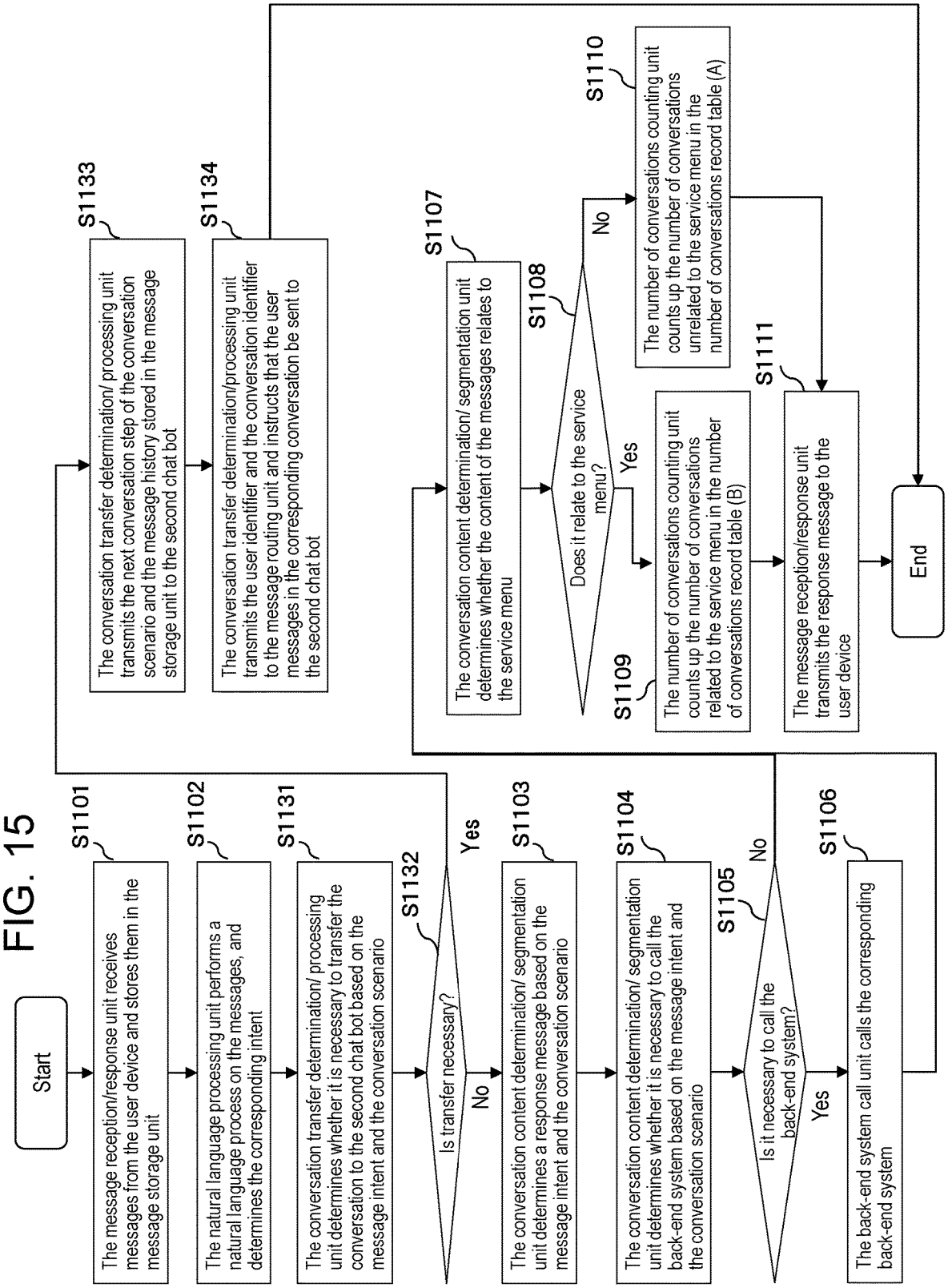
FIG. 15 is a flowchart for explaining the chat bot conversation process according to the third embodiment.

FIG. 15 is a flowchart illustrating the resource allocation modification process according to the third embodiment.

The operations based on the flowchart of FIG. 15 are as follows, and only those steps modified from the first embodiment or the second embodiment are described below:

Step S1131:

After Steps S1101 and S1102, in the transfer determination/processing unit 118, the chat bot 11 determines whether or not it is necessary to transfer the conversation to the second chat bot 11' based on the message intent and the conversation scenarios.

In the present embodiment, in the case that the presence or absence of the relationship with the service menu is false, transfer is determined to be necessary. It should be noted that, as another method, the number of consecutive conversations for which the presence or absence of the relationship with the service menu is false may be recorded, and transfer may be determined to be necessary in the case that this number exceeds a predefined threshold value.

Step S1132:

As a result of the transfer necessity determination in Step S1131, in the case that transfer is necessary (Yes), the process performs Step S1133 and proceeds to Step S1134. In the case that transfer is unnecessary (No), the processing from the aforementioned Step S1103 to Step S1111 is performed, and the process ends.

Step S1133:

In the conversation transfer determination/processing unit 118, the chat bot 11 transmits the next conversation step of the conversation scenario and the message history stored in the message storage unit to the second chat bot 11'. In addition, the status and conversation history are deleted from the first chat bot 11. Then, the process proceeds to Step S1134.

Step S1134:

In the conversation transfer determination/processing unit 118, the chat bot 11 transmits the user identifier and the conversation identifier to the message routing unit 119, instructs the message routing unit 119 to transmit the user messages in the corresponding conversation to the second chat bot 11', and ends the processing.

Figure 16:
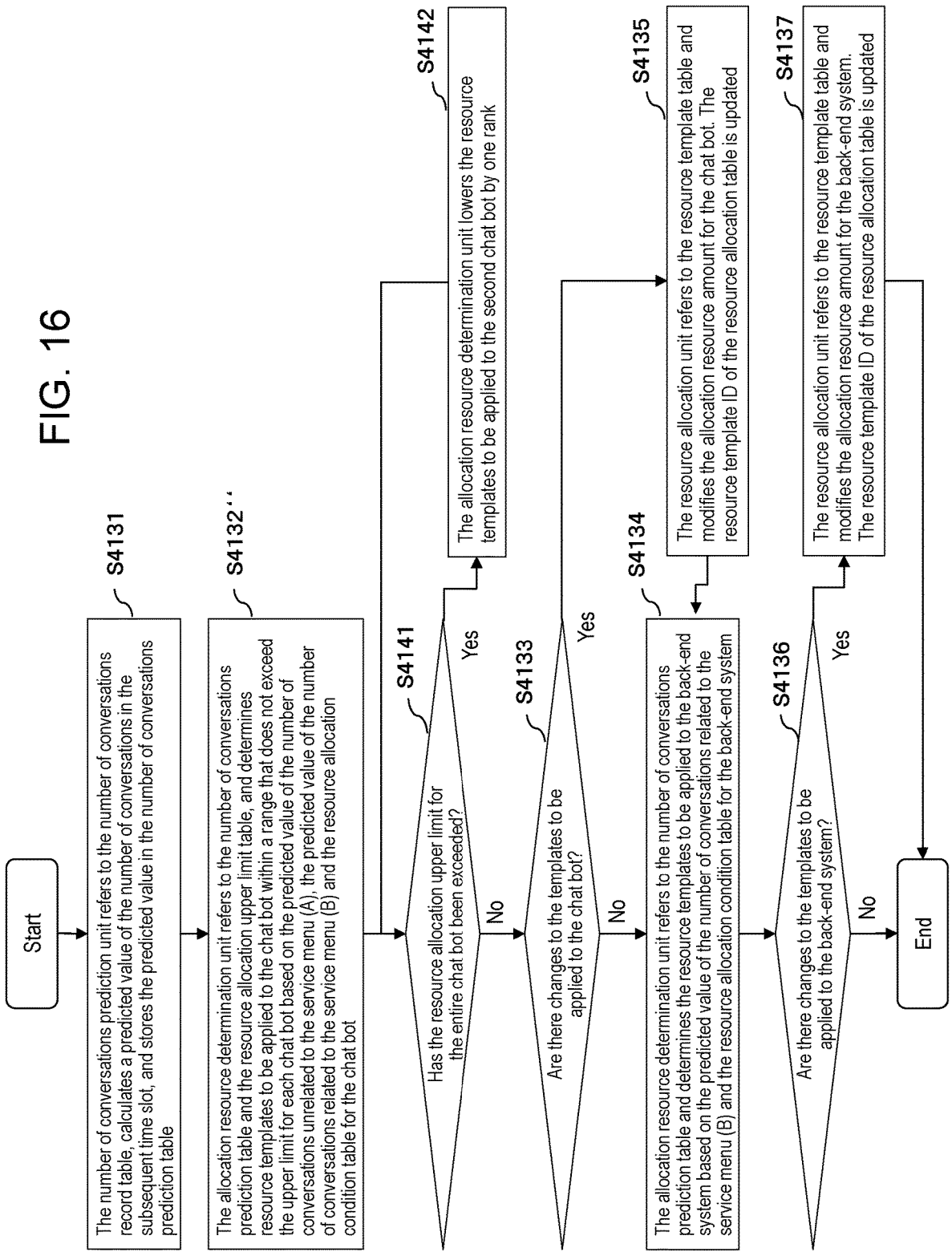
FIG. 16 is a flowchart for explaining the resource allocation modification process according to the third embodiment.

FIG. 16 is a flowchart illustrating the resource allocation modification process according to the third embodiment.

The operations based on the flowchart of FIG. 16 are as follows, and only those steps that differ from those of the first embodiment will be described below.

Step S4232":

After Step S4131, in the number of conversations prediction unit 411, the resource management unit 41 refers to the number of conversations prediction table 41511 and the resource allocation upper limit table 41561, determines resource templates to be applied to each chat bot within a range that does not exceed the upper limit for each chat bot based on the predicted values of the number of conversations related to the service menu (B) and the resource allocation condition table for the chat bot, and proceeds to Step S4141.

Step S4141:

The resource management unit 41 determines whether or not the resource allocation upper limit for the entire chat bot has been exceeded based on the resource templates determined in Step S4232". As a result of the determination, in the case that the resource allocation upper limit is exceeded (Yes), the process proceeds to Step S4142, and in the case that the resource allocation upper limit is not exceeded (No), the process proceeds to Step S4133.

Step S4142:

In the case that the resource allocation upper limit is exceeded in Step S4141 (Yes), the resource manage unit 41 causes the allocation resource determination unit 412 to lower the resource templates to be applied to the second chat bot by one rank. For example, in the present embodiment, the smaller the value of the numerical part of the ID of the resource template table 41521, the lower the rank, and the larger the value of the numerical part, the higher the rank. Accordingly, lowering the resource template by one rank means, for example, that when the ID of the resource template determined in Step S4232" is t2, that the resource template to be applied to the second chat bot is changed to t1. It should be noted that the method of expressing the rank of the resource template is not limited to this, and other methods may be used.

After Step S4142, the resource management unit 41 returns to Step S4141 and determines whether or not the resource allocation upper limit of the entire chat bot has been exceeded.

In the case that the resource allocation upper limit is not exceeded (No), the process proceeds to Step S4133, where the above-described Steps S4133 to S4137 are executed in order, and the process is terminated.

Figure 17:
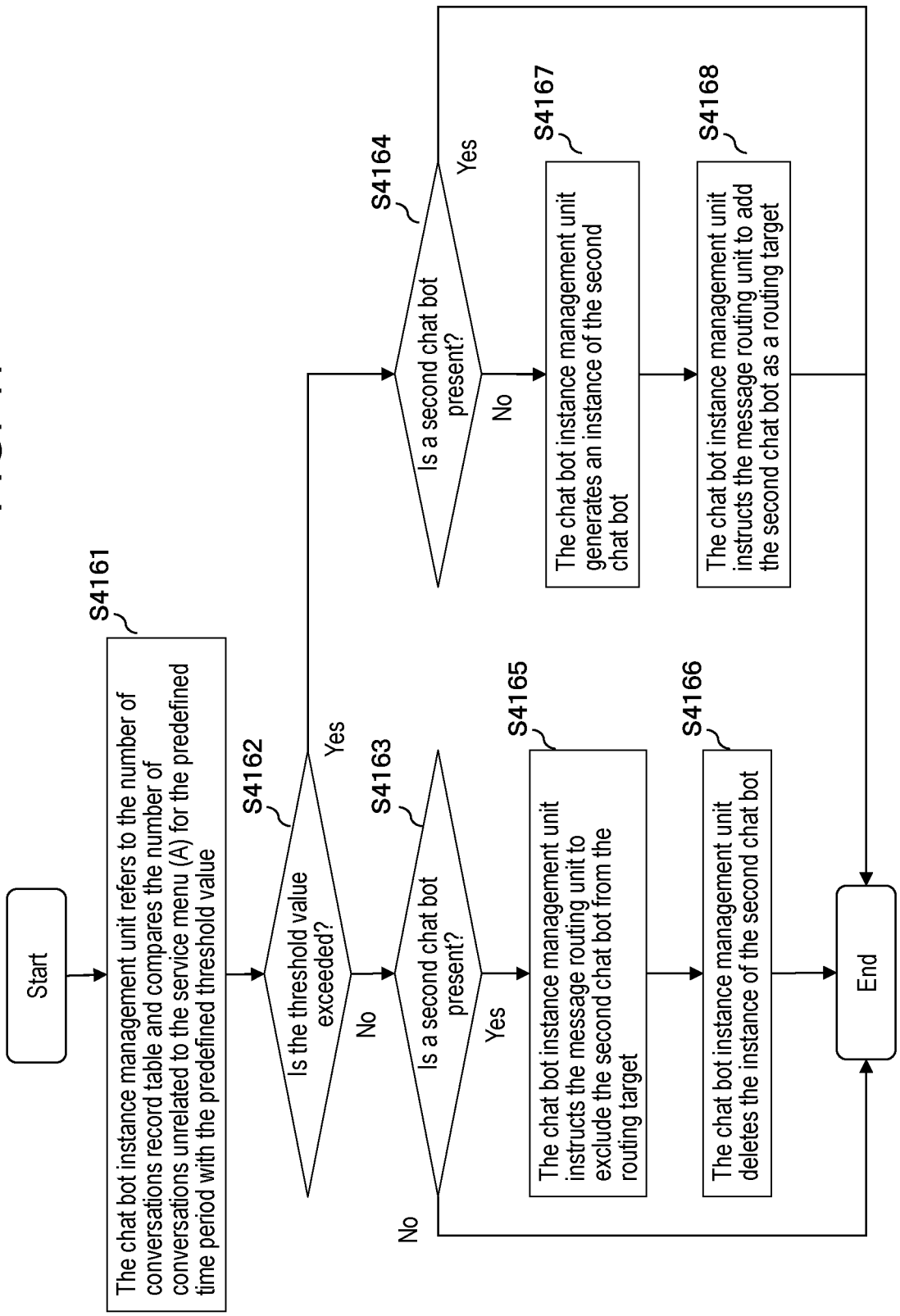
FIG. 17 is a flowchart for explaining a chat bot instance management process according to the third embodiment.

FIG. 17 is a flow chart for explaining a chat bot instance management process in the chat bot instance management unit 414 according to the third embodiment. This flowchart is periodically executed independently from the conversation with the user.

Step S4161:

The chat bot instance management unit 414 refers to the number of conversations record table 11321, and compares the sum of the number of conversations unrelated to the service menu (A) in the predefined time period with the predefined thresholds. The predefined period may be, for example, one hour prior to the time when the processing of Step S4161 was executed, but this period is not particularly limited.

Step S4162:

As a result of the processing of Step S4161, in the case that the total value of the number of conversations unrelated to the service menu (A) does not exceed the predefined threshold value (No), the processing proceeds to Step S4163, and in the case that the total value of the number of conversations unrelated to the service menu (A) exceeds the predefined threshold value (Yes), the processing proceeds to Step S4164.

Step S4163:

The chat bot instance management unit 414 determines whether the second chat bot 11' is present. As a result of the determination of this step, if the second chat bot 11' is not present, the process ends.

If the second chat bot 11' is present, the process proceeds to Step S4165.

It should be noted that the method of determining the presence of the second chat bot 11' may include, for example, a method in which the resource manage unit 41 makes the determinations by storing and maintaining a list of existing chat bot instances in the storage unit 415, or a method in which a command for verifying the presence of the chat bot instance is executed with respect to the second chat bot 11' via a network and the determination is made based on the presence or absence of a response to the command, but the present invention is not particularly limited.

Step S4165:

The chat bot instance management unit 414 instructs the message routing unit 119 to exclude the second chat bot 11' as a routing target, that is, to stop sending messages to the second chat bot, and proceeds to Step S4166.

Step S4166:

The chat bot instance management unit 414 deletes the instance of the second chat bot 11' and ends the process.

Step S4164:

The chat bot instance management unit 414 determines whether or not the second chat bot 11' is present. If the result of the determination in this step is that the second chat bot 11' is present (Yes), the process ends.

In the case that the second chat bot 11' does not exist (No), the process proceeds to Step S4167.

Step S4167:

The chat bot instance management unit 414 generates an instance of the second chat bot 11' and proceeds to Step S4168.

Step S4168:

The chat bot instance management unit 414 instructs the message routing unit 119 to add the second chat bot 11' as a routing target, and ends the process.

FIG. 18 is a diagram illustrating the data configuration of a number of conversations per user record table 11322, according to the third embodiment.

The number of conversations per user record table 11322 includes, for each user ID, a recording date and time, the number of conversations unrelated to the service menu (A), and the number of conversations related to the service menu (B). In the present embodiment, the number of conversations per user record table 11322 indicates that User 2 has more conversations unrelated to the service menu (A) than does User 1.

FIG. 19 is a flow chart illustrating an initial routing determination process of a conversation in the conversation transfer determination/processing unit 118 according to the third embodiment. The operations based on the flowchart of FIG. 19 are as follows.

In the present embodiment, the processing illustrated in the flow chart of FIG. 19 is executed prior to the chat bot conversation process when the chat bot 11 receives a first message from a user.

Step S4171:

The conversation transfer determination/processing unit 118 refers to the number of conversations per user record table 11322, and acquires the number of conversations of the corresponding user.

Step S4172:

The conversation transfer determination/processing unit 118 compares the sum of the number of conversations unrelated to the service menu (A) for a predefined period of time to predefined thresholds.

Step S4173:

As a result of the determination in Step S4172, it is determined whether or not the sum value of the conversations unrelated to the service menu (A) exceeds a predefined threshold value, and if the sum value of the conversations exceeds the predefined threshold value (Yes), the process proceeds to Step S4174. In the case that the sum value of the conversations unrelated to the service menu (A) does not exceed the predetermined threshold value (No), the process proceeds to Step S4175.

Step S4174:

The conversation transfer determination/processing unit 118 transmits the user identifier and the conversation identifier to the message routing unit 119, instructs the message routing unit 119 to transmit the user messages in the corresponding conversation to the second chat bot 11', and ends the process.

Step S4175:

The chat bot conversation process described with reference to FIG. 15 is executed, and the conversation process is terminated.

According to the embodiments described above, appropriate resources can be allocated to the chat bot and the back-end-system, respectively. In particular, unnecessary increases in resources to the back-end-system due to an increase in conversations unrelated to a service menu can be avoided.

In addition, for the service provider, by optimizing the resource allocation of the chat bot and the back-end-system, it is possible to avoid increased costs associated with unnecessary resource allocation.

REFERENCE SIGNS LIST

1 Resource allocation system
10 Chat bot system
11, 11' Chat bot
111 Message reception/response unit
111' Voice message reception/response unit
112 Natural language processing unit
113 Storage unit
1131 Message storage unit
1132 Number of conversations storage unit
1133 Conversation scenario storage unit
1134 Classification results/service relationship presence or absence correspondence storage unit
114 Conversation content determination/classification unit
115 Number of conversations counting unit
116 Back-end-system call unit
117 Voice recognition unit
118 Conversation transfer determination/processing unit
119 Message routing unit
20 User device
30 Back-end-system
40 Resource management system
41 Resource management unit
411 Number of conversations prediction unit
412 Allocation resource determination unit
413 Resource allocation unit
414 Chat bot instance management unit
415 Storage unit
4151 Number of conversations prediction storage unit
4152 Resource template storage unit
4153 Resource allocation condition storage unit
4154 Resource allocation storage unit
4156 Resource allocation upper limit storage unit
50 Operator device

The invention claimed is:

1. A resource allocation method for allocating resources to a chat bot configured to automatically respond to a message-based inquiry from a user and a back-end system operating in cooperation with the chat bot, the resource allocation method comprising:

a conversation content determination/classification step of determining and classifying whether a conversation via messages between the user and the chat bot is a conversation related to a service menu or a conversation unrelated to a service menu;

a number of conversations counting step of counting a number of conversations related to the service menu and a number of conversations unrelated to the service menu;

an allocation resource determination step of determining an allocation resource amount for the chat bot based on an increase or decrease in a first number of conversations related to the service menu and a second number of conversations unrelated to the service menu as counted in the number of conversations counting step, and determining an allocation resource amount for the back-end-system based on an increase or decrease in the first number of conversations; and a resource allocation step of allocating the resource amounts determined in the allocation resource determination step to the chat bot and the back-end system.

2. The resource allocation method of claim 1, further comprising:

a number of conversations prediction step of receiving the first number of conversations related to the service menu and the second number of conversations unrelated to the service menu as counted in the number of conversations counting step, and predicting the first number of conversations and the second number of conversations; and an allocation resource determination step of determining an allocation resource amount for the chat bot based on an increase or decrease of the first number of conversations and the second number of conversations predicted in the number of conversations prediction step, and receiving the first number of conversations related to the service menu and determining an allocation resource amount for the back-end system based on an increase or decrease of the first number of conversations.

3. The resource allocation method of claim 1, wherein:
the conversation content determination/classification step includes:
a step of determining a presence or absence of a relationship between the conversation and the service menu based on a determination flag defined in each step of a conversation content determination/classification process in a conversation scenario between the chat bot and the user.

4. The resource allocation method of claim 1, wherein the conversation content determination/classification step includes:
a step of determining a presence or absence of a relationship between the conversation and the service menu based on a classification results and presence/absence of service relationship table corresponding to a presence/absence of a relationship between a classification result based on natural language processing of a message from the user and the service menu.

5. The resource allocation method of claim 1, wherein:
in a case that the chat bot receives an audio message from the user,
in the allocation resource determination step, repeated conversations caused by misstatements of the user and/or misperceptions of the chat bot are not used in determination of resource allocations for the back-end-system.

6. The resource allocation method of claim 1, further comprising:
a step of dispatching conversations unrelated to the service menu to a second chat bot that differs from the chat bot; and wherein the second chat bot is allocated resources with a lower priority and/or a lower upper limit than the chat bot.

7. The resource allocation method according to claim 6, further comprising:
a step of generating an instance of the second chat bot when a number of conversations unrelated to the service menu exceeds a predetermined threshold.

8. The resource allocation method according to claim 6, further comprising:
a step of deleting an instance of the second chat bot when a number of conversations unrelated to the service menus falls below a predetermined threshold.

9. The resource allocation method according to claim 6, further comprising:
a step of causing the second chat bot to respond with automated responses to a conversation of the user in which a ratio of conversations unrelated to the service menu exceeds a predetermined threshold in a historical record.

10. A resource allocation system for allocating resources to a chat bot configured to automatically respond to a message-based inquiry from a user and a back-end system operating in cooperation with the chat bot, the resource allocation system comprising:
a conversation content determination/classification unit for determining and classifying whether a conversation via messages between the user and the chat bot is a conversation related to a service menu or a conversation unrelated to a service menu;
a number of conversations counting unit for counting a number of conversations related to the service menu and a number of conversations unrelated to the service menu;
an allocation resource determination unit for determining an allocation resource amount for the chat bot based on an increase or decrease in a first number of conversations related to the service menu and a second number of conversations unrelated to the service menu as counted in the number of conversations counting step, and determining an allocation resource amount for the back-end-system based on an increase or decrease in the first number of conversations; and
a resource allocation unit for allocating the resource amounts determined in the allocation resource determination step to the chat bot and the back-end system.

11. The resource allocation system of claim 10, further comprising:
a number of conversations prediction unit for receiving the first number of conversations related to the service menu and the second number of conversations unrelated to the service menu as counted by the number of conversations counting unit, and predicting the first number of conversations and the second number of conversations; and
an allocation resource determination unit for determining an allocation resource amount for the chat bot based on an increase or decrease of the first number of conversations and the second number of conversations predicted by the number of conversations prediction unit, and receiving the first number of conversations related to the service menu and determining an allocation resource amount for the back-end system based on an increase or decrease of the first number of conversations.

12. The resource allocation system of claim 10, further comprising:
a message routing unit for dispatching conversations unrelated to the service menu to a second chat bot that differs from the chat bot; and
wherein, in the allocation resource determination unit, the message routing unit allocates resources to the second chat bot with a lower priority and/or a lower upper limit than the chat bot.

* * * * *